(12) United States Patent
Kubo et al.

(10) Patent No.: US 11,535,726 B2
(45) Date of Patent: Dec. 27, 2022

(54) ULTRAVIOLET- AND INFRARED-ABSORBING COMPOSITION AND ULTRAVIOLET- AND INFRARED-ABSORBING FILTER

(71) Applicant: Nippon Sheet Glass Company, Limited, Tokyo (JP)

(72) Inventors: Yuichiro Kubo, Tokyo (JP); Katsuhide Shimmo, Kanagawa (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 768 days.

(21) Appl. No.: 16/496,086

(22) PCT Filed: Dec. 12, 2017

(86) PCT No.: PCT/JP2017/044618
§ 371 (c)(1),
(2) Date: Sep. 20, 2019

(87) PCT Pub. No.: WO2018/173386
PCT Pub. Date: Sep. 27, 2018

(65) Prior Publication Data
US 2020/0040161 A1    Feb. 6, 2020

(30) Foreign Application Priority Data

Mar. 22, 2017   (JP) .............................. JP2017-055698

(51) Int. Cl.
*C08K 5/5357*    (2006.01)
*C08K 5/521*    (2006.01)
(Continued)

(52) U.S. Cl.
CPC ............ *C08K 5/5357* (2013.01); *C08G 77/18* (2013.01); *C08K 5/521* (2013.01); *G02B 5/208* (2013.01)

(58) Field of Classification Search
CPC ...... C08K 5/5357; C08K 5/521; C08G 77/18; G02B 5/208
See application file for complete search history.

(56) References Cited

U.S. PATENT DOCUMENTS

2011/0223420 A1   9/2011   Ichiroku
2012/0243077 A1   9/2012   Osawa et al.
(Continued)

FOREIGN PATENT DOCUMENTS

EP    3106495    12/2016
JP    H1152127    2/1999
(Continued)

OTHER PUBLICATIONS

International Search Report and Written Opinion issued for International Patent Application No. PCT/JP2017/044618, dated Mar. 6, 2018, 8 pages including English translation of Search Report.

*Primary Examiner* — Mary Ellen Bowman
(74) *Attorney, Agent, or Firm* — Hamre, Schumann, Mueller & Larson, P.C.

(57) ABSTRACT

A UV-IR-absorbing composition according to the present invention includes: an absorber formed by a phosphonic acid represented by the following formula (a) and copper ion, the absorber being dispersed in the UV-IR-absorbing composition; a phosphoric acid ester allowing the absorber to be dispersed; a matrix resin; and an alkoxysilane monomer.

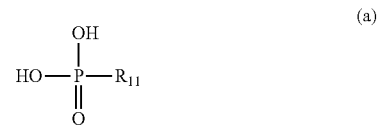

(a)

14 Claims, 5 Drawing Sheets

(51) Int. Cl.
    *C08G 77/18*     (2006.01)
    *G02B 5/20*     (2006.01)

(56) References Cited

U.S. PATENT DOCUMENTS

2016/0362332 A1    12/2016    Morita et al.
2018/0003872 A1    1/2018    Kubo et al.
2019/0219749 A1    7/2019    Shimmo et al.

FOREIGN PATENT DOCUMENTS

| | | |
|---|---|---|
| JP | 2002006101 | 1/2002 |
| JP | 2005338395 | 12/2005 |
| JP | 2009242650 | 10/2009 |
| JP | 2009263190 | 11/2009 |
| JP | 2011063814 | 3/2011 |
| JP | 2011190339 | 9/2011 |
| JP | 2011203467 | 10/2011 |
| JP | 2012103340 | 5/2012 |
| JP | 2012185385 | 9/2012 |
| JP | 2015004944 | 1/2015 |
| JP | 2016124903 | 7/2016 |
| JP | 6087464 | 3/2017 |
| WO | 2011071052 | 6/2011 |
| WO | 2015129563 | 9/2015 |
| WO | 2017006571 | 1/2017 |

ULTRAVIOLET- AND INFRARED-ABSORBING COMPOSITION AND ULTRAVIOLET- AND INFRARED-ABSORBING FILTER

TECHNICAL FIELD

The present invention relates to an ultraviolet- and infrared-absorbing composition and an ultraviolet- and infrared-absorbing filter.

BACKGROUND ART

In imaging apparatuses employing a solid-state imaging sensor such as a charge coupled device (CCD) or a complementary metal oxide semiconductor (CMOS), any of various optical filters is disposed ahead of the solid-state imaging sensor in order to obtain an image with good color reproduction. Solid-state imaging sensors generally have spectral sensitivity over a wide wavelength range from the ultraviolet to infrared regions. The visual sensitivity of humans lies solely in the visible region. Thus, a technique is known in which an optical filter shielding against infrared light or ultraviolet light is disposed ahead of a solid-state imaging sensor in an imaging apparatus in order to allow the spectral sensitivity of the solid-state imaging sensor to approximate to the visual sensitivity of humans.

For example, Patent Literature 1 describes a near-infrared cut filter including a norbornene resin substrate and a near-infrared-reflecting film. The near-infrared-reflecting film is made of a dielectric multilayer film. The norbornene resin substrate contains a near-infrared absorber.

Patent Literature 2 describes a near-infrared cut filter including a laminated sheet having a resin layer provided on at least one side of a glass substrate, the near-infrared cut filter satisfying predetermined requirements as to transmittance. The resin layer contains a near-infrared absorber. The near-infrared cut filter preferably has a dielectric multilayer film provided on at least one side of the laminated sheet.

Patent Literature 3 describes a near-infrared cut filter formed of a near-infrared absorber and a resin. The near-infrared absorber is obtained from a particular phosphonic acid compound, a particular phosphoric acid ester compound, and a copper salt. The particular phosphonic acid compound has a monovalent group $R^1$ bonded to a phosphorus atom P and represented by —$CH_2CH_2$—$R^{11}$. $R^{11}$ represents a hydrogen atom, an alkyl group having 1 to 20 carbon atoms, or a fluorinated alkyl group having 1 to 20 carbon atoms.

CITATION LIST

Patent Literature

Patent Literature 1: JP 2005-338395 A
Patent Literature 2: JP 2012-103340 A
Patent Literature 3: JP 2011-203467 A

SUMMARY OF INVENTION

Technical Problem

In the techniques described in Patent Literatures 1 and 2, the near-infrared cut filters need to have a dielectric multilayer film capable of reflecting or absorbing near-infrared light in order for the near-infrared cut filters to have desired properties. All the near-infrared cut filters described in examples of Patent Literature 2 have a dielectric multilayer film formed of alternating silica ($SiO_2$) and titania ($TiO_2$) layers. Thus, the techniques described in Patent Literatures 1 and 2 require an apparatus such as a vacuum deposition apparatus for production of the near-infrared cut filters and tend to involve complicated production steps.

In the technique described in Patent Literature 3, the near-infrared cut filter described in Patent Literature 3 does not need a dielectric multilayer film. However, the wavelength range corresponding to the transmission region of this near-infrared cut filter is wide, and thus this near-infrared cut filter may permit transmission of near-infrared light of certain wavelengths or ultraviolet light of certain wavelengths and offer optical properties deviating from the visual sensitivity of humans. The term "transmission region" refers to the wavelength range where the transmittance spectrum shows a transmittance of 70% or more. The term "transmittance spectrum" refers to one in which the transmittance (units: %) of light incident on an optical filter is represented as a function of wavelength.

Moreover, Patent Literatures 1 to 3 fail to specifically discuss the moisture resistance of the near-infrared cut filters.

In view of the above circumstances, the present invention provides an ultraviolet- and infrared-absorbing composition for an ultraviolet- and infrared-absorbing filter having properties advantageous for allowing the spectral sensitivity of a solid-state imaging sensor to approximate to the visual sensitivity of humans with a simple configuration and having good moisture resistance. The present invention also provides an ultraviolet- and infrared-absorbing filter produced using this ultraviolet- and infrared-absorbing composition.

Solution to Problem

The present invention provides an ultraviolet- and infrared-absorbing composition, including:

an absorber formed by a phosphonic acid represented by the following formula (a) and copper ion, the absorber being dispersed in the ultraviolet- and infrared-absorbing composition:

(a)

wherein $R_{11}$ is a phenyl group, a nitrophenyl group, a hydroxyphenyl group, or a halogenated phenyl group in which at least one hydrogen atom of a phenyl group is substituted by a halogen atom;

a phosphoric acid ester allowing the absorber to be dispersed;

a matrix resin; and an alkoxysilane monomer.

The present invention also provides an ultraviolet- and infrared-absorbing filter, including:

a transparent dielectric substrate; and an absorbing layer including, an absorber formed by a phosphonic acid represented by the following formula (a) and copper ion, a phosphoric acid ester allowing the absorber to be dispersed, and a compound having a siloxane bond, the absorbing layer formed parallel to one principal surface of the transparent dielectric substrate:

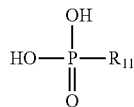
(a)

wherein $R_{11}$ is a phenyl group, a nitrophenyl group, a hydroxyphenyl group, or a halogenated phenyl group in which at least one hydrogen atom of a phenyl group is substituted by a halogen atom.

The present invention also provides a method for producing ultraviolet- and infrared-absorbing filters, including:

applying the above ultraviolet- and infrared-absorbing composition parallel to one principal surface of a transparent dielectric substrate to form a film on the one principal surface, and, exposing the film to an environment at a temperature of 50° C. to 200° C. and to an environment at a temperature of 50° C. to 100° C. and a relative humidity of 80% to 100% to form an absorbing layer.

Advantageous Effects of Invention

The above ultraviolet- and infrared-absorbing filter (hereinafter referred to as "UV-IR-absorbing filter") has properties advantageous for allowing the spectral sensitivity of an imaging sensor to approximate to the visual sensitivity of humans with a simple configuration and has good moisture resistance. Such a UV-IR-absorbing filter can be produced using the above ultraviolet- and infrared-absorbing composition (hereinafter referred to as "UV-IR-absorbing composition").

DESCRIPTION OF EMBODIMENTS

Figure 1:
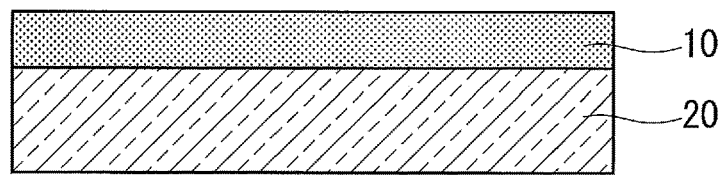
FIG. 1 is a cross-sectional view showing an exemplary UV-IR-absorbing filter of the present invention.

Hereinafter, embodiments of the present invention will be described with reference to the drawings. The following description is directed to some examples of the present invention, and the present invention is not limited by these examples.

A UV-IR-absorbing composition according to the present invention includes: an absorber formed by a phosphonic acid represented by the following formula (a) and copper ion, the absorber being dispersed in the ultraviolet- and infrared-absorbing composition:

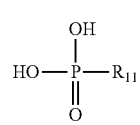
(a)

wherein $R_{11}$ is a phenyl group, a nitrophenyl group, a hydroxyphenyl group, or a halogenated phenyl group in which at least one hydrogen atom of a phenyl group is substituted by a halogen atom;

a phosphoric acid ester allowing the absorber to be dispersed;

a matrix resin; and an alkoxysilane monomer.

The present inventors went through much trial and error to develop a novel UV-IR-absorbing composition for producing a UV-IR-absorbing filter having properties advantageous for allowing the spectral sensitivity of a solid-state imaging sensor to approximate to the visual sensitivity of humans with a simple configuration. This resulted in newly finding that the desired properties can be imparted to a UV-IR-absorbing filter with the use of a composition in which a phosphonic acid represented by the formula (a) is included as a phosphonic acid for forming an absorber along with copper ion and in which a phosphoric acid ester is further included. In the phosphonic acid, a functional group such as a phenyl group is directly bonded to the phosphorus atom, as shown in the formula (a). The phosphoric acid ester allows the absorber to be uniformly dispersed in the UV-IR-absorbing composition. Meanwhile, the present inventors newly found that under a certain hot and humid environment, a UV-IR-absorbing filter produced using such a composition can turn whitish and the performance thereof can be deteriorated. The present inventors figured out by diligent study that the cause of the whitening is production of a visible deposit by hydrolysis of a part of the phosphoric acid ester not interacting with another compound or ion such as the copper ion in a hot and humid environment. On that basis, the present inventors conducted intensive studies on a technique for increasing the moisture resistance of the UV-IR-absorbing filter. This resulted in newly finding that decreasing the content of the phosphoric acid ester and including an alkoxysilane monomer in the composition allows a UV-IR-absorbing filter produced using the composition to have good moisture resistance. The decrease in the content of the phosphoric acid ester not interacting with the copper ion is thought to reduce opportunities for hydrolysis of the phosphoric acid ester in a hot and humid environment. The UV-IR-absorbing composition according to the present invention has been invented based on these new findings of the present inventors.

Since the phosphoric acid ester allows the absorber to be uniformly dispersed in the UV-IR-absorbing composition, a low content of the phosphoric acid ester in the UV-IR-absorbing composition appears to cause a decrease in dispersibility of the absorber in the UV-IR-absorbing composition. However, the alkoxysilane monomer included in the UV-IR-absorbing composition according to the present invention can cause steric hindrance to prevent particles of the absorber from aggregating with each other. This enables the absorber to be dispersed well in the UV-IR-absorbing composition despite the decrease in the content of the phosphoric acid ester. It is desirable that when the UV-IR-absorbing composition is used to produce a UV-IR-absorbing filter, a treatment in which a hydrolysis reaction and polycondensation reaction of the alkoxysilane monomer sufficiently occur be performed to form a siloxane bond (—Si—O—Si—). This makes it possible for the UV-IR-absorbing filter to have good moisture resistance. The UV-IR-absorbing filter additionally has good heat resistance. This is because a siloxane bond is greater in binding energy and chemically more stable than bonds such as a —C—C— bond and —C—O— bond and is thus excellent in heat resistance and moisture resistance.

In other words, in a coating liquid in which fine particles containing the absorber formed by the phosphonic acid and copper ion are dispersed, the alkoxysilane monomer serves as a dispersant that improves the dispersibility of the fine particles. The alkoxysilane monomer also serves as a skeleton material that hardens an absorbing layer formed by applying and curing the coating liquid.

One possible method for making the alkoxysilane monomer sufficiently serve as the skeleton material is to add water to the coating liquid to cause a hydrolysis reaction and dehydration polycondensation reaction of the alkoxysilane monomer. However, if water is added to the coating liquid, an alkoxy group is eliminated from the alkoxysilane monomer due to hydrolysis, and that impairs the function of the alkoxysilane monomer, which imparts steric hindrance. In addition, the reactions rapidly proceed only around added water, leading to a loss of the homogeneous state of the coating liquid. Moreover, when the coating liquid contains a hydrophobic organic solvent, the addition of water to the coating liquid results in phase separation of water. For these reasons, the fine particles containing the absorber aggregate, which causes whitening. The present inventors found that, as described above, it is difficult to obtain both the function as the dispersant and the function as the skeleton material when the actions of the alkoxysilane monomer is utilized.

The present inventors then conducted further studies and found a method for forming, from the UV-IR-absorbing composition, a hard and dense absorbing layer in which the dispersibility of the fine particles containing the absorber is maintained at a high level and the fine particles containing the absorber are not aggregated. According to this method, a film is formed using the UV-IR-absorbing composition without adding water to the UV-IR-absorbing composition and subjected to sintering at a given temperature and then to a humidification treatment. Thus, a hydrolysis reaction and polycondensation reaction of the alkoxysilane monomer progress to promote formation of a siloxane bond. The hard and dense absorbing layer in which the fine particles containing the absorber are not aggregated can be formed in this manner.

The ratio of the content of the phosphonic acid to the content of the phosphoric acid ester is, for example, 0.80 or more on a mass basis. Despite of such a decrease in the content of the phosphoric acid ester, the absorber is well dispersed in the UV-IR-absorbing composition and the UV-IR-absorbing filter produced using the UV-IR-absorbing composition has good moisture resistance and good heat resistance.

The phosphonic acid represented by the formula (a) is not particularly limited. Examples of the phosphonic acid represented by the formula (a) include phenylphosphonic acid, nitrophenylphosphonic acid, hydroxyphenylphosphonic acid, bromophenylphosphonic acid, dibromophenylphosphonic acid, fluorophenylphosphonic acid, difluorophenylphosphonic acid, chlorophenylphosphonic acid, or dichlorophenylphosphonic acid.

The phosphoric acid ester is not limited to any particular one, as long as the phosphoric acid ester allows good dispersion of the absorber. For example, the phosphoric acid ester includes at least one of a phosphoric acid diester represented by the following formula (c1) and a phosphoric acid monoester represented by the following formula (c2). In this case, the absorber can be more reliably dispersed in the UV-IR-absorbing composition without being aggregated. In the formulae (c1) and (c2), $R_{21}$, $R_{22}$, and $R_3$ are each a monovalent functional group represented by —$(CH_2CH_2O)_nR_4$, wherein n is an integer of 1 to 25 and $R_4$ is an alkyl group having 6 to 25 carbon atoms. $R_{21}$, $R_{22}$, and $R_3$ may be the same or different functional groups.

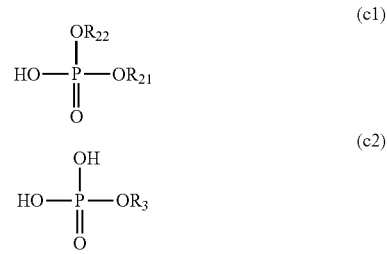

The phosphoric acid ester can be, for example, but not particularly limited to PLYSURF A208N (polyoxyethylene alkyl (C12, C13) ether phosphoric acid ester), PLYSURF A208F (polyoxyethylene alkyl (C8) ether phosphoric acid ester), PLYSURF A208B (polyoxyethylene lauryl ether phosphoric acid ester), PLYSURF A219B (polyoxyethylene lauryl ether phosphoric acid ester), PLYSURF AL (polyoxyethylene styrenated phenylether phosphoric acid ester), PLYSURF A212C (polyoxyethylene tridecyl ether phosphoric acid ester), or PLYSURF A215C (polyoxyethylene tridecyl ether phosphoric acid ester). All of these are products manufactured by DKS Co., Ltd. The phosphoric acid ester can be NIKKOL DDP-2 (polyoxyethylene alkyl ether phosphoric acid ester), NIKKOL DDP-4 (polyoxyethylene alkyl ether phosphoric acid ester), or NIKKOL DDP-6 (polyoxyethylene alkyl ether phosphoric acid ester). All of these are products manufactured by Nikko Chemicals Co., Ltd.

The source of copper ion in the UV-IR-absorbing composition is, for example, a copper salt. The copper salt is, for example, copper acetate or a hydrate of copper acetate. Examples of the copper salt may include anhydrides and hydrates of copper chloride, copper formate, copper stearate, copper benzoate, copper pyrophosphate, copper naphthenate, and copper citrate. For example, copper acetate monohydrate is represented by $Cu(CH_3COO)_2 \cdot H_2O$, and 1 mol of copper acetate monohydrate supplies 1 mol of copper ion.

In the UV-IR-absorbing composition, the ratio of the content of the phosphonic acid to the content of the phosphoric acid ester is, for example, 3.60 or less, desirably 3.30 or less, on a mass basis. In this case, uniform dispersion of the absorber in the UV-IR-absorbing composition is more reliably achieved.

In the UV-IR-absorbing composition, the ratio of the content of the phosphonic acid to a sum of the content of the alkoxysilane monomer calculated as a hydrolysis-polycondensation product and the content of the phosphoric acid ester is, for example, 0.40 to 1.30. In this case, uniform dispersion of the absorber in the UV-IR-absorbing composition is more reliably achieved. The term "content of the alkoxysilane monomer calculated as a hydrolysis-polycondensation product" refers to the mass of a hydrolysis-polycondensation product yielded by complete hydrolysis and polycondensation reactions of the alkoxysilane monomer.

In the UV-IR-absorbing composition, the ratio of the content of the alkoxysilane monomer calculated as a hydrolysis-polycondensation product to the content of the phosphoric acid ester is, for example, 0.38 to 4.00. In this case, the UV-IR-absorbing filter produced using the UV-IR-absorbing composition more reliably has good moisture resistance.

The matrix resin of the UV-IR-absorbing composition is, for example, a heat-curable or ultraviolet-curable resin in which the absorber is dispersible and the cured product of which is transparent to light with a wavelength of 350 nm to 900 nm. The content of the phosphonic acid represented by the formula (a) is, for example, 3 to 180 parts by mass with respect to 100 parts by mass of the matrix resin.

The matrix resin of the UV-IR-absorbing composition is, for example, a silicone resin. The silicone resin is a compound having a siloxane bond (—Si—O—Si—) in the structure thereof. In this case, since the alkoxysilane monomer-derived hydrolysis-polycondensation compound of the alkoxysilane monomer also has a siloxane bond in the UV-IR-absorbing filter, the alkoxysilane monomer-derived hydrolysis-polycondensation compound of the alkoxysilane monomer and the matrix resin are compatible with each other in the UV-IR-absorbing filter. Moreover, the absorber appropriately dispersed owing to the alkoxysilane monomer is included in the matrix resin which is the silicone resin. This makes the UV-IR-absorbing filter likely to exhibit high transparency to light in the visible light region.

The matrix resin is desirably a silicone resin containing an aryl group such as a phenyl group. If a resin layer included in the UV-IR-absorbing filter is excessively hard (rigid), the likelihood of cure shrinkage-induced cracking during the production process of the UV-IR-absorbing filter increases with increasing thickness of the resin layer. When the matrix resin is a silicone resin containing an aryl group, the layer formed by the UV-IR-absorbing composition is likely to have high crack resistance. A silicone resin containing an aryl group has high compatibility with a phosphonic acid represented by the formula (a) and reduces the likelihood of aggregation of the absorber. Further, when the matrix resin of the UV-IR-absorbing composition is a silicone resin containing an aryl group, it is desirable for the phosphoric acid ester included in the UV-IR-absorbing composition to have a linear organic functional group, such as an oxyalkyl group, which has flexibility, just as does the phosphoric acid ester represented by the formula (c1) or formula (c2). This is because interaction derived from the combination of a phosphonic acid represented by the formula (a), a silicone resin containing an aryl group, and a phosphoric acid ester having a linear organic functional group such as an oxyalkyl group enables the absorber to have high compatibility with the matrix resin and the phosphoric acid ester and allows curing of the UV-IR-absorbing composition to yield a layer having both desired rigidity and desired flexibility. Specific examples of the silicone resin available as the matrix resin include KR-255, KR-300, KR-2621-1, KR-211, KR-311, KR-216, KR-212, and KR-251. All of these are silicone resins manufactured by Shin-Etsu Chemical Co., Ltd.

The alkoxysilane monomer is not limited to any particular one as long as, in the UV-IR-absorbing filter, the alkoxysilane monomer can form the hydrolysis-polycondensation compound having a siloxane bond by a hydrolysis reaction and polycondensation reaction. The alkoxysilane monomer is, for example, tetramethoxysilane, tetraethoxysilane, methyltrimethoxysilane, methyltriethoxysilane, dimethyldiethoxysilane, dimethyldimethoxysilane, phenyltrimethoxysilane, phenyltriethoxysilane, 3-glycidoxypropyltrimethoxysilane, 3-glycidoxypropyltriethoxysilane, or 3-glycidoxypropylmethyldiethoxysilane.

The UV-IR-absorbing composition may further include, for example, an auxiliary absorber formed by a phosphonic acid represented by the following formula (b) and copper ion. In the formula, $R_{12}$ is an alkyl group having 6 or less carbon atoms, a benzyl group, or a halogenated benzyl group in which at least one hydrogen atom of a benzene ring of a benzyl group is substituted by a halogen atom.

(b)

The inclusion of the auxiliary absorber in the UV-IR-absorbing composition can advantageously reduce the light transmittance of the UV-IR-absorbing filter at a wavelength of 850 nm or more or at a wavelength of 900 nm or more. When $R_{12}$ is the alkyl group, $R_{12}$ may be linear or branched. In the UV-IR-absorbing composition, the ratio of the content of the phosphonic acid represented by the formula (b) to the content of the phosphonic acid represented by the formula (a) is, for example, 0.03 to 0.74, desirably 0.06 to 0.56, on a mass basis.

The phosphonic acid represented by the formula (b) is not limited to any particular one. The phosphonic acid represented by the formula (b) is, for example, ethylphosphonic acid, methylphosphonic acid, propylphosphonic acid, butylphosphonic acid, pentylphosphonic acid, hexylphosphonic acid, benzylphosphonic acid, bromobenzylphosphonic acid, dibromobenzylphosphonic acid, fluorobenzylphosphonic acid, difluorobenzylphosphonic acid, chlorobenzylphosphonic acid, or dichlorobenzylphosphonic acid.

The absorber in the UV-IR-absorbing composition is formed, for example, by coordination of the phosphonic acid represented by the formula (a) to copper ion. For example, fine particles containing at least the absorber are present in the UV-IR-absorbing composition. In this case, the actions of the phosphoric acid ester and alkoxysilane monomer allow the fine particles to be dispersed in the UV-IR-absorbing composition without aggregation. The average particle diameter of the fine particles is, for example, 5 nm to 200 nm. When the average particle diameter of the fine particles is 5 nm or more, no particular ultramiconization process is required to obtain the fine particles, and the risk of structural destruction of the fine particles containing at least the absorber is low. Additionally, the fine particles are well dispersed in the UV-IR-absorbing composition. When the average particle diameter of the fine particles is 200 nm or less, it is possible to reduce the influence of Mie scattering, increase the visible transmittance of the UV-IR-absorbing filter, and prevent deterioration of the properties such as contrast and haze of an image captured by an imaging apparatus. The average particle diameter of the fine particles is desirably 100 nm or less. In this case, the influence of Rayleigh scattering is reduced, and thus the absorbing layer formed using the UV-IR-absorbing composition has an increased transparency to visible light. The average particle diameter of the fine particles is more desirably 75 nm or less. In this case, the absorbing layer formed using the UV-IR-absorbing composition has especially high transparency to visible light. The average particle diameter of the fine particles can be measured by a dynamic light scattering method.

When the UV-IR-absorbing composition includes the auxiliary absorber, the auxiliary absorber is formed, for example, by coordination of the phosphonic acid represented by the formula (b) to copper ion. For example, fine particles containing at least the auxiliary absorber are present in the UV-IR-absorbing composition. The average particle diameter of the fine particles containing the auxiliary absorber is, for example, similar to the average particle diameter of the fine particles containing the absorber.

As shown in FIGS. 1 to 4, UV-IR-absorbing filters 1a to 1d exemplifying the UV-IR-absorbing filter according to the present invention include a transparent dielectric substrate 20 and an absorbing layer 10. The absorbing layer 10 includes an absorber formed by a phosphonic acid represented by the above formula (a) and copper ion, a phosphoric acid ester allowing the absorber to be dispersed, and a compound having a siloxane bond. The absorbing layer 10 is formed parallel to one principal surface of the transparent dielectric substrate 20.

The absorbing layer 10 of the UV-IR-absorbing filters 1a to 1d is formed, for example, by applying the above UV-IR-absorbing composition onto one principal surface of the transparent dielectric substrate 20 to form a layer of a film parallel to the principal surface of the transparent dielectric substrate 20, and curing and drying the film.

In the UV-IR-absorbing filters 1a to 1d, a hydrolysis-polycondensation compound, which is not a matrix resin, of an alkoxysilane monomer is typically formed by a hydrolysis reaction and polycondensation reaction of the alkoxysilane monomer included in the above UV-IR-absorbing composition. That is, in the UV-IR-absorbing filters 1a to 1d, the compound having a siloxane bond includes the hydrolysis-polycondensation compound of the alkoxysilane monomer.

In the UV-IR-absorbing filters 1a to 1d, a matrix resin for forming the absorbing layer 10 is formed, for example, by polymerization of the above silicone resin based on its siloxane bond. That is, in the UV-IR-absorbing filters 1a to 1d, the compound having a siloxane bond includes the silicone resin which is the matrix resin.

In the UV-IR-absorbing filters 1a to 1d, the ratio of the content of the phosphonic acid to the content of the phosphoric acid ester is, for example, 0.80 or more on a mass basis. In this case, the UV-IR-absorbing filters 1a to 1d more reliably have good moisture resistance and good heat resistance.

As seen from the above formula (a), the phosphonic acid for forming the absorber contains a phenyl group, nitrophenyl group, hydroxyphenyl group, or halogenated phenyl group. The phenyl group, nitrophenyl group, hydroxyphenyl group, and halogenated phenyl group have high lipophilicity and hence high compatibility with organic solvents such as toluene, thus reducing the likelihood of aggregation of the absorber. When the phosphonic acid constituting the absorber has the phenyl group, nitrophenyl group, hydroxyphenyl group, or halogenated phenyl group, the absorbing layer 10 of the UV-IR-absorbing filters 1a to 1d is likely to have a flexible structure. Consequently, the absorbing layer 10 has high crack resistance.

For example, the absorbing layer 10 of the UV-IR-absorbing filters 1a to 1d may further include an auxiliary absorber formed by a phosphonic acid represented by the above formula (b) and copper ion.

In the UV-IR-absorbing filters 1a to 1d, the absorbing layer 10 has a thickness of, for example, 200 μm or less. In the absorbing layer 10, the ratio of the content of the phosphonic acid to the content of the phosphoric acid ester is 0.80 or more on a mass basis. The absorbing layer 10 includes the alkoxysilane monomer-derived hydrolysis-polycondensation compound of the alkoxysilane monomer. Thus, the UV-IR-absorbing filters 1a to 1d have good moisture resistance although the thickness of the absorbing layer 10 is decreased to 200 μm or less. Being possible to reduce the thickness of the UV-IR-absorbing filters 1a to 1d is advantageous in reducing the profile of a solid-state imaging sensor module.

In the UV-IR-absorbing filters 1a to 1d, the absorbing layer 10 desirably has a thickness of 180 μm or less. The absorbing layer 10 has a thickness of, for example, 30 μm or more.

The UV-IR-absorbing filters 1a to 1d satisfy, for example, the following requirements (I) to (V).

(I) The UV-IR-absorbing filters 1a to 1d have an average spectral transmittance of 80% or more in a wavelength range of 450 nm to 600 nm.

(II) The UV-IR-absorbing filters 1a to 1d have a spectral transmittance of 3% or less in a wavelength range of 750 nm to 900 nm.

(III) The UV-IR-absorbing filters 1a to 1d have an average spectral transmittance of 4% or less in a wavelength range of 350 nm to 370 nm.

(IV) The UV-IR-absorbing filters 1a to 1d have a decreasing spectral transmittance with increasing wavelength in a wavelength range of 600 nm to 800 nm. When a wavelength which lies in the wavelength range of 600 nm to 800 nm and at which the spectral transmittance of the UV-IR-absorbing filters 1a to 1d is 50% is defined as an infrared cut-off wavelength, the infrared cut-off wavelength for light incident on the UV-IR-absorbing filters 1a to 1d at an incident angle of 0° is in a range of 620 nm to 680 nm.

(V) The UV-IR-absorbing filters 1a to 1d have an increasing spectral transmittance with increasing wavelength in a wavelength range of 350 nm to 450 nm. When a wavelength which lies in the wavelength range of 350 nm to 450 nm and at which the spectral transmittance of the UV-IR-absorbing filters 1a to 1d is 50% is defined as an ultraviolet cut-off wavelength, the ultraviolet cut-off wavelength for light incident on the UV-IR-absorbing filters 1a to 1d at an incident angle of 0° is in a range of 380 nm to 430 nm.

By virtue of the fact that the UV-IR-absorbing filters 1a to 1d satisfy the above requirement (I), when any of the UV-IR-absorbing filters 1a to 1d is disposed ahead of a solid-state imaging sensor, the solid-state imaging sensor receives a large amount of visible light in the wavelength range of 450 nm to 600 nm. By virtue of the fact that the UV-IR-absorbing filters 1a to 1d satisfy the above requirement (II), the UV-IR-absorbing filters 1a to 1d can advantageously shield against infrared light with a wavelength of 750 nm to 900 nm. Additionally, by virtue of the fact that the UV-IR-absorbing filters 1a to 1d satisfy the above requirement (III), the UV-IR-absorbing filters 1a to 1d can advantageously shield against ultraviolet light with a wavelength of 370 nm or less. In consequence, disposing any of the UV-IR-absorbing filters 1a to 1d ahead of a solid-state imaging sensor advantageously allows the spectral sensitivity of the solid-state imaging sensor to approximate to the visual sensitivity of humans. Further, by virtue of the fact that the UV-IR-absorbing filters 1a to 1d satisfy the above requirements (IV) and (V), the UV-IR-absorbing filters 1a to 1d advantageously shield against light in the infrared and ultraviolet regions. In consequence, disposing any of the UV-IR-absorbing filters 1a to 1d ahead of a solid-state imaging sensor advantageously allows the spectral sensitivity of the solid-state imaging sensor to approximate to the visual sensitivity of humans.

Concerning the above requirement (I), the UV-IR-absorbing filters 1a to 1d desirably have an average spectral transmittance of 85% or more in the wavelength range of 450 nm to 600 nm. In this case, when any of the UV-IR-absorbing filters 1a to 1d is disposed ahead of a solid-state imaging sensor, the solid-state imaging sensor receives a larger amount of visible light in the wavelength range of 450 nm to 600 nm.

Concerning the above requirement (II), the UV-IR-absorbing filters 1a to 1d desirably have a spectral transmittance of 1% or less in the wavelength range of 750 nm to 900 nm and more desirably have a spectral transmittance of 0.5% or less. Concerning the above requirement (III), the UV-IR-absorbing filters 1a to 1d desirably have an average spectral transmittance of 1% or less in the wavelength range of 350 nm to 370 nm. In this case, disposing any of the UV-IR-absorbing filters 1a to 1d ahead of a solid-state imaging sensor allows the spectral sensitivity of the solid-state imaging sensor to further approximate to the visual sensitivity of humans.

Concerning the above requirement (IV), the infrared cut-off wavelength for light incident on the UV-IR-absorbing filters 1a to 1d at an incident angle of 0° is desirably 630 nm or more. The infrared cut-off wavelength for light incident on the UV-IR-absorbing filters 1a to 1d at an incident angle of 0° is desirably 660 nm or less. Concerning the requirement (V), the ultraviolet cut-off wavelength for light incident on the UV-IR-absorbing filters 1a to 1d at an incident angle of 0° is desirably 390 nm or more. The ultraviolet cut-off wavelength for light incident on the UV-IR-absorbing filters 1a to 1d at an incident angle of 0° is desirably 420 nm or less. In this case, disposing any of the UV-IR-absorbing filters 1a to 1d ahead of a solid-state imaging sensor allows the spectral sensitivity of the solid-state imaging sensor to further approximate to the visual sensitivity of humans.

The UV-IR-absorbing filters 1a to 1d further satisfy, for example, the following requirements (VI) and (VII). (VI) The difference between the infrared cut-off wavelength for light incident on the UV-IR-absorbing filters 1a to 1d at an incident angle of 0° and the infrared cut-off wavelength for light incident on the UV-IR-absorbing filters 1a to 1d at an incident angle of 40° is 20 nm or less and desirably 10 nm or less. (VII) The difference between the ultraviolet cut-off wavelength for light incident on the UV-IR-absorbing filters 1a to 1d at an incident angle of 0° and the ultraviolet cut-off wavelength for light incident on the UV-IR-absorbing filters 1a to 1d at an incident angle of 40° is 20 nm or less and desirably 10 nm or less.

When any of the UV-IR-absorbing filters 1a to 1d satisfying the above requirements (VI) and (VII) is disposed ahead of a solid-state imaging sensor, the spectral sensitivity of the solid-state imaging sensor does not vary much according to the incident angle of light incident on the solid-state imaging sensor.

The UV-IR-absorbing filters 1a to 1d further satisfy the following requirements (i) to (v) when, for example, a long-term moisture resistance test in which the UV-IR-absorbing filters 1a to 1d are exposed to an environment at a temperature of 60° C. and a relative humidity of 90% for 500 hours is performed and transmittance spectra measured for the UV-IR-absorbing filters 1a to 1d before and after the long-term moisture resistance test are each normalized using the same normalization coefficient so as to allow the UV-IR-absorbing filters 1a to 1d measured before the long-term moisture resistance test to have a maximum transmittance of 1.0% or 0.5% in the wavelength range of 750 to 900 nm in the transmittance spectra.

(i) An absolute value of a difference between the average transmittance in the wavelength range of 450 to 600 nm before the long-term moisture resistance test and the average transmittance in the wavelength range of 450 to 600 nm after the long-term moisture resistance test is 3 points or less.

(ii) An absolute value of a difference between the average transmittance in the wavelength range of 350 to 370 nm before the long-term moisture resistance test and the average transmittance in the wavelength range of 350 to 370 nm after the long-term moisture resistance test is 1 point or less.

(iii) An absolute value of a difference between the maximum transmittance in the wavelength range of 750 to 900 nm before the long-term moisture resistance test and the maximum transmittance in the wavelength range of 750 to 900 nm after the long-term moisture resistance test is 1 point or less.

(iv) The UV-IR-absorbing filters 1a to 1d have a decreasing spectral transmittance with increasing wavelength in a wavelength range of 600 nm to 800 nm and, when a wavelength which lies in the wavelength range of 600 nm to 800 nm and at which the spectral transmittance of the UV-IR-absorbing filters 1a to 1d is 50% is defined as an infrared cut-off wavelength, an absolute value of a difference between the infrared cut-off wavelength before the long-term moisture resistance test and the infrared cut-off wavelength after the long-term moisture resistance test is 3 nm or less.

(v) The UV-IR-absorbing filters 1a to 1d have an increasing spectral transmittance with increasing wavelength in a wavelength range of 350 nm to 450 nm and, when a wavelength which lies in the wavelength range of 350 nm to 450 nm and at which the spectral transmittance of the UV-IR-absorbing filters 1a to 1d is 50% is defined as an ultraviolet cut-off wavelength, an absolute value of a difference between the ultraviolet cut-off wavelength before the long-term moisture resistance test and the ultraviolet cut-off wavelength after the long-term moisture resistance test is 3 nm or less.

As described above, the UV-IR-absorbing filters 1a to 1d, for example, have stable transmittance properties varying little before and after the long-term moisture resistance test and have excellent moisture resistance.

The transparent dielectric substrate 20 in the UV-IR-absorbing filters 1a to 1d is not limited to any particular one as long as the transparent dielectric substrate 20 is a dielectric substrate having an average spectral transmittance of 90% or more in the wavelength range of 450 nm to 600 nm. In some cases, the transparent dielectric substrate 20 may have the ability to absorb light in the infrared region. Also in this case, the UV-IR-absorbing filters 1a to 1d satisfying the above requirements (I) to (V) can be obtained. Naturally, the transparent dielectric substrate 20 may have an average spectral transmittance of 90% or more, for example, in a wavelength range of 350 nm to 900 nm. The material of the transparent dielectric substrate 20 is not limited to any particular material, and the material is, for example, a certain type of glass or resin. When the material of the transparent dielectric substrate 20 is a glass, the transparent dielectric substrate 20 is, for example, a transparent glass substrate or an infrared cut glass substrate made of a silicate glass such as soda-lime glass or borosilicate glass. The infrared cut glass substrate is made of, for example, a phosphate glass or fluorophosphate glass containing CuO. When the transparent dielectric substrate 20 is an infrared cut glass substrate, the infrared-absorbing ability required of the absorbing layer 10 can be decreased thanks to the infrared-absorbing ability of the infrared cut glass substrate. This can result in a reduction in the thickness of the absorbing layer 10 or a decrease in the concentration of the absorber in the absorbing layer 10. For the infrared cut glass substrate, the infrared cut-off wavelength in the transmittance spectrum tends to lie on a relatively long-wavelength side. Thus, if the above UV-IR-absorbing composition is cured to form the absorbing layer 10 on the transparent dielectric substrate 20 which is the infrared cut glass substrate, the infrared cut-off wavelength of the UV-IR-absorbing filters 1a to 1d is likely to lie on the short-wavelength side, and this makes the spectral sensitivity of a solid-state imaging sensor more likely to agree with the visual sensitivity of humans.

When the material of the transparent dielectric substrate 20 is a resin, the resin is, for example, a cyclic olefin resin such as a norbornene resin, a polyarylate resin, an acrylic resin, a modified acrylic resin, a polyimide resin, a polyetherimide resin, a polysulfone resin, a polyethersulfone resin, a polycarbonate resin, or a silicone resin.

An exemplary method for preparing the UV-IR-absorbing composition according to the present invention will now be described. First, a copper salt such as copper acetate monohydrate is added to a given solvent such as tetrahydrofuran (THF), and the mixture is stirred to give a copper salt solution. To this copper salt solution are then added phosphoric acid ester compounds such as a phosphoric acid diester represented by the formula (c1) and a phosphoric acid monoester represented by the formula (c2), and the mixture is stirred to prepare a solution A. A solution B is also prepared by adding a phosphonic acid represented by the formula (a) to a given solvent such as THF and stirring the mixture. When a plurality of phosphonic acids are used as the phosphonic acid represented by the formula (a), the solution B may be prepared by adding each phosphonic acid to a given solvent such as THF, stirring the mixture, and mixing a plurality of preliminary liquids respectively prepared with the phosphonic acids. For example, in the preparation of the solution B, an alkoxysilane monomer may be added. The solution B is added to the solution A while the solution A is stirred, and the mixture is further stirred for a given period of time. To the resultant solution is then added a given solvent such as toluene, and the mixture is stirred to obtain a solution C. Subsequently, the solution C is subjected to solvent removal under heating for a given period of time to obtain a solution D. This process removes the solvent such as THF and the component such as acetic acid (boiling point: about 118° C.) generated by disassociation of the copper salt, thus yielding an absorber formed by the phosphonic acid represented by the formula (a) and copper ion. The temperature at which the solution C is heated is chosen based on the boiling point of the to-be-removed component disassociated from the copper salt. During the solvent removal, the solvent such as toluene (boiling point: about 110° C.) used to obtain the solution C is also evaporated. A certain amount of this solvent desirably remains in the UV-IR-absorbing composition. This is preferably taken into account in determining the amount of the solvent to be added and the time period of the solvent removal. To obtain the solution C, o-xylene (boiling point: about 144° C.) may be used instead of toluene. In this case, the amount of o-xylene to be added can be reduced to about one-fourth of the amount of toluene to be added, because the boiling of o-xylene is higher than the boiling point of toluene.

When the UV-IR-absorbing composition includes the auxiliary absorber, a solution H is additionally prepared for example, as follows. First, a copper salt such as copper acetate monohydrate is added to a given solvent such as tetrahydrofuran (THF), and the mixture is stirred to give a copper salt solution. To this copper salt solution are then added phosphoric acid ester compounds such as a phosphoric acid diester represented by the formula (c1) and a phosphoric acid monoester represented by the formula (c2), and the mixture is stirred to prepare a solution E. A solution F is also prepared by adding a phosphonic acid represented by the formula (b) to a given solvent such as THF and stirring the mixture. When a plurality of phosphonic acids are used as the phosphonic acid represented by the formula (b), the solution F may be prepared by adding each phosphonic acid to a given solvent such as THF, stirring the mixture, and mixing a plurality of preliminary liquids respectively prepared with the phosphonic acids. The solution F is added to the solution E while the solution E is stirred, and the mixture is further stirred for a given period of time. To the resultant solution is then added a given solvent such as toluene, and the mixture is stirred to obtain a solution G. Subsequently, the solution G is subjected to solvent removal under heating for a given period of time to obtain a solution H. This process removes the solvent such as THF and the component such as acetic acid generated by disassociation of the copper salt, thus yielding an auxiliary absorber formed by the phosphonic acid represented by the formula (b) and copper ion. The temperature at which the solution G is heated is determined as in the case of the solution C. The solvent for obtaining the solution G is also determined as in the case of the solution C.

The UV-IR-absorbing composition according to the present invention can be prepared by adding the matrix resin such as a silicone resin to the solution D and stirring the mixture. When the UV-IR-absorbing composition includes the auxiliary absorber, the UV-IR-absorbing composition can be prepared by adding the matrix resin such as a silicone resin to the solution D and stirring the mixture to obtain a solution I, and further adding the solution H to the solution I and stirring the mixture.

The solvents used for the preparation of the UV-IR-absorbing composition desirably have certain polarities in order to achieve appropriate formation of the absorber by the phosphonic acid represented by the formula (a) and copper ion. This is because the polarities of the solvents have influence on how fine particles containing at least the absorber are dispersed in the UV-IR-absorbing composition. For example, solvents having appropriate polarities are chosen depending on the types of the phosphoric acid esters used for the preparation of the solution A.

An exemplary method for producing the UV-IR-absorbing filter 1a according to an example of the present invention will now be described. First, the UV-IR-absorbing composition is applied parallel to one principal surface of the transparent dielectric substrate to form a film on the one principal surface. For example, the UV-IR-absorbing composition in a liquid form is applied by spin coating or with a dispenser to one principal surface of the transparent dielectric substrate 20 to form a film on the one principal surface. Next, this film is subjected to a given heat treatment to cure the film. For example, the film is exposed to an environment at a temperature of 50° C. to 200° C. The film is subjected to a humidification treatment, if necessary, to sufficiently hydrolyze the alkoxysilane monomer included in the UV-IR-absorbing composition. For example, the film is exposed to an environment at a temperature of 50° C. to 100° C. and a relative humidity of 80% to 100%. A repeating structure $(Si-O)_n$ of a siloxane bond is thus formed. The humidification treatment can be omitted in some cases. In this manner, the UV-IR-absorbing filter 1a can be produced. In order to securely form the absorbing layer 10 and at the same time improve the optical properties of the UV-IR-absorbing filter 1a, the maximum of the ambient temperature at which the film is subjected to the heat treatment is, for example, 85° C. or higher. The conditions of the humidification treatment of the film are not limited to any particular ones as long as the conditions can promote the hydrolysis reaction and polycondensation reaction of the alkoxysilane monomer. The humidification treatment of the film is performed, for example, by exposing the film for a given period of time to an environment where the temperature condition, which is 60° C. to 100° C., and the relative humidity condition, which is 80% to 100%, are appropriately combined. An example of the combination of the temperature condition and relative humidity condition of the humidification treatment of the film is a combination of a temperature of 85° C. and a relative humidity of 85%. Another example of the combination of the temperature condition and relative humidity condition of the humidification treatment of the film is a combination of a temperature of 65° C. and a relative humidity of 95%.

Figure 2:
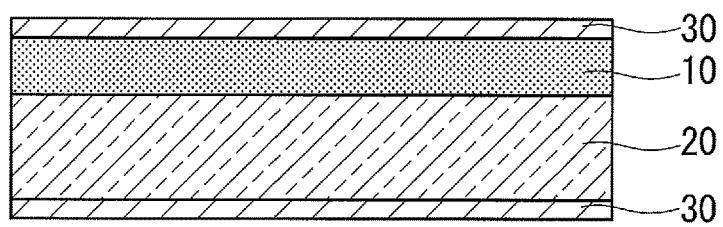
FIG. 2 is a cross-sectional view showing another exemplary UV-IR-absorbing filter of the present invention.

As shown in FIG. 2, the UV-IR-absorbing filter 1b according to another example of the present invention includes an infrared-reflecting film 30. The infrared-reflecting film 30 is a film formed by alternating layers of different materials having different refractive indices. The materials forming the infrared-reflecting film 30 are, for example, inorganic materials such as $SiO_2$, $TiO_2$, and $MgF_2$ or organic materials such as fluorine resins. A laminate having the infrared-reflecting film 30 formed on a transparent dielectric substrate, for example, permits transmission of light with a wavelength of 350 nm to 800 nm and reflects light with a wavelength of 850 nm to 1200 nm. The laminate including the infrared-reflecting film 30 has a spectral transmittance of, for example, 85% or more, desirably 90% or more, in a wavelength range of 350 nm to 800 nm and has a spectral transmittance of, for example, 1% or less, desirably 0.5% or less, in a wavelength range of 850 nm to 1200 nm. Thus, the UV-IR-absorbing filter 1b can more effectively shield against light in a wavelength range of 850 nm to 1200 nm or in a wavelength range of 900 nm to 1200 nm. When the spectral transmittance of the laminate including the infrared-reflecting film 30 has characteristics as described above, it is possible to reduce the influence exerted on the transmittance spectrum of the UV-IR-absorbing filter 1b by the shift of the transmittance spectrum of the laminate including the infrared-reflecting film 30 with change in incident angle of light. This is because the absorber formed by a phosphonic acid represented by the formula (a) and copper ion exhibits light-absorbing ability in a region where the transmission spectrum of the infrared-reflecting film shows a wavelength shift with varying incident angle of light.

The method for forming the infrared-reflecting film 30 of the UV-IR-absorbing filter 1b is not particularly limited, and any of vacuum deposition, sputtering, chemical vapor deposition (CVD), and sol-gel process employing spin coating or spray coating can be used according to the kind of the material forming the infrared-reflecting film 30.

Figure 3:
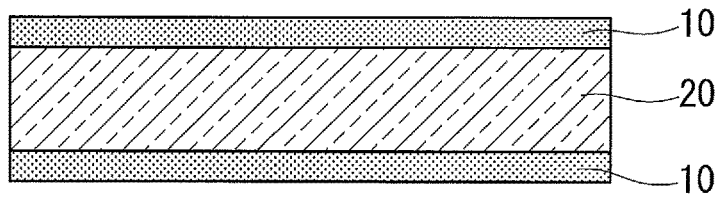
FIG. 3 is a cross-sectional view showing yet another exemplary UV-IR-absorbing filter of the present invention.

As shown in FIG. 3, the UV-IR-absorbing filter 1c according to another example of the present invention has the absorbing layers 10 formed on both principal surfaces of the transparent dielectric substrate 20. Thus, the absorbing layer thickness required for the UV-IR-absorbing filter 1c to have desired optical properties can be ensured by two absorbing layers 10 rather than by one absorbing layer 10. The absorbing layers 10 on both principal surfaces of the transparent dielectric substrate 20 may have the same or different thicknesses. That is, the formation of the absorbing layers 10 on both principal surfaces of the transparent dielectric substrate 20 is done so that the two absorbing layers 10 account for equal or unequal proportions of the absorbing layer thickness required for the UV-IR-absorbing filter 1c to have desired optical properties. Thus, the thickness of each of the absorbing layers 10 formed on both principal surfaces of the transparent dielectric substrate 20 is relatively small. This can prevent thickness non-uniformity of the absorbing layer which can occur when the thickness of the absorbing layer is large. Additionally, it is possible to shorten the time spent on the application of the UV-IR-absorbing composition in a liquid form and shorten the time taken for the curing of the film of the UV-IR-absorbing composition applied. If the absorbing layer 10 is formed only on one principal surface of the transparent dielectric substrate 20 that is very thin, the UV-IR-absorbing filter may be warped due to a stress induced by shrinkage occurring during formation of the absorbing layer 10 from the UV-IR-absorbing composition. The formation of the absorbing layers 10 on both principal surfaces of the transparent dielectric substrate 20 can prevent warping of the UV-IR-absorbing filter 1c even when the transparent dielectric substrate 20 is very thin.

Figure 4:
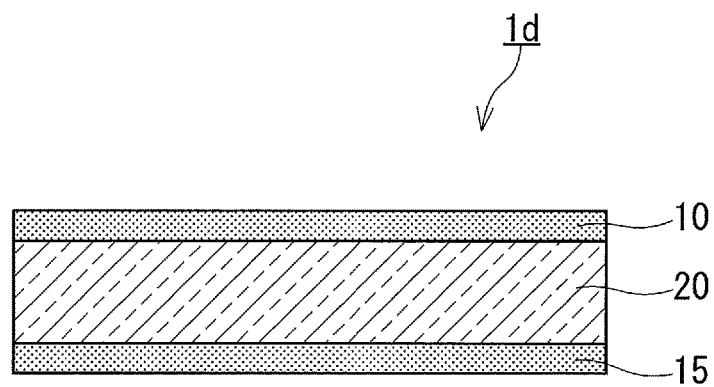
FIG. 4 is a cross-sectional view showing yet another exemplary UV-IR-absorbing filter of the present invention.

As shown in FIG. 4, the UV-IR-absorbing filter 1d according to another example of the present invention further includes an auxiliary absorbing layer 15 formed parallel to one principal surface of the transparent dielectric substrate 20. The auxiliary absorbing layer 15 is formed, for example, by a cured product of an auxiliary UV-IR-absorbing composition, the auxiliary UV-IR-absorbing composition including: an auxiliary absorber formed by a phosphonic acid represented by the formula (b) and copper ion; a phosphoric acid ester allowing the auxiliary absorber to be dispersed; and a matrix resin. By this inclusion of the auxiliary absorbing layer 15, the UV-IR-absorbing filter 1d can advantageously reduce the transmittance of light with a wavelength of 850 nm or more or a wavelength of 900 nm or more.

For example, as shown in FIG. 4, the absorbing layer 10 is formed on one principal surface of the transparent dielectric substrate 20, and the auxiliary absorbing layer 15 is formed on the other principal surface of the transparent dielectric substrate 20. In this case, the stress acting on the transparent dielectric substrate 20 due to the formation of the absorbing layer 10 and the stress acting on the transparent dielectric substrate 20 due to the formation of the auxiliary absorbing layer 15 are balanced, so that the likelihood of warping of the UV-IR-absorbing filter is reduced.

The phosphoric acid ester and matrix resin in the auxiliary UV-IR-absorbing composition can, for example, be the same as the phosphoric acid ester and matrix resin in the UV-IR-absorbing composition.

The auxiliary UV-IR-absorbing composition in a liquid form is applied by spin coating or with a dispenser to one principal surface of the transparent dielectric substrate 20 to form a film on the one principal surface. Next, the film is subjected to a given heat treatment to cure the film. In this manner, the UV-IR-absorbing filter 1d can be produced. The heat treatment for forming the absorbing layer 10 and the heat treatment for forming the auxiliary absorbing layer 15 may be performed simultaneously.

Figure 5:
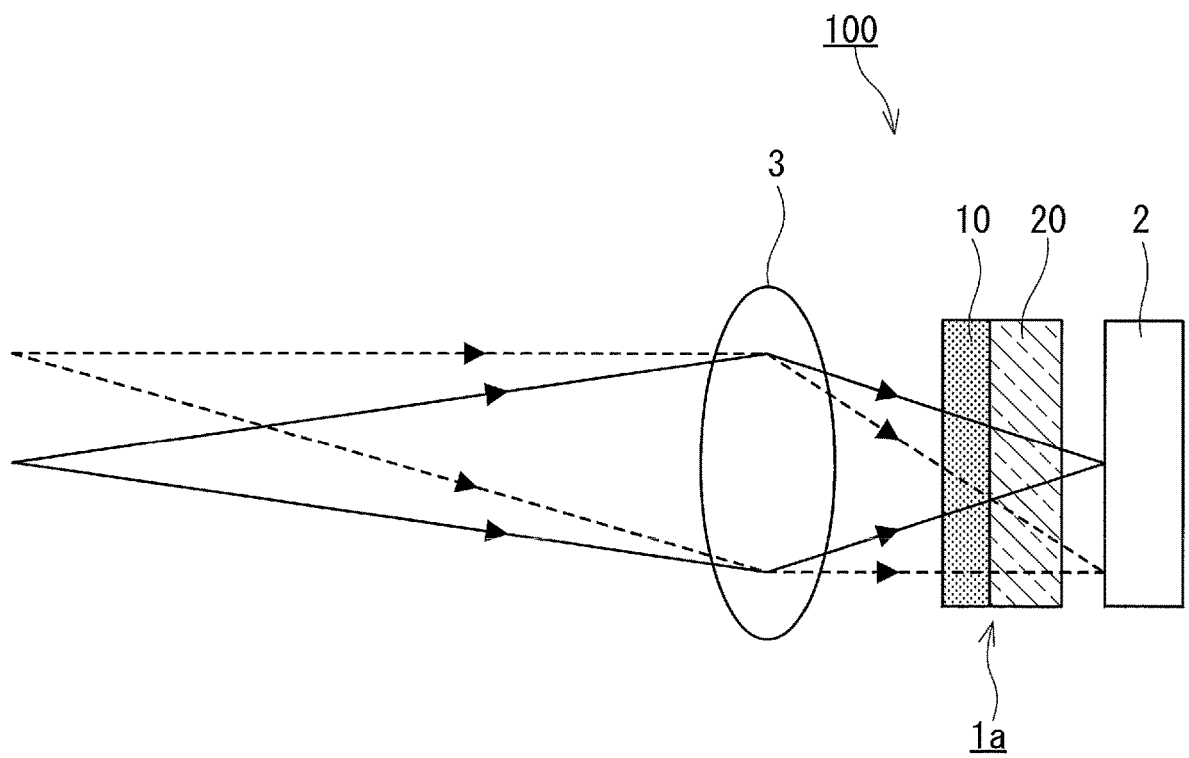
FIG. 5 is a cross-sectional view of an exemplary imaging optical system of the present invention.

For example, as shown in FIG. 5, an imaging optical system 100 can be provided by the use of the UV-IR-absorbing filter 1a. The imaging optical system 100 further includes, for example, an imaging lens 3 in addition to the UV-IR-absorbing filter 1a. The imaging optical system 100 is disposed ahead of an imaging sensor 2 in an imaging apparatus such as a digital camera. The imaging sensor 2 is, for example, a solid-state imaging sensor such as a CCD or CMOS. As shown in FIG. 5, light coming from an object is focused by the imaging lens 3, the ultraviolet and infrared portions of the light are cut by the UV-IR-absorbing filter 1a, and then the light is incident on the imaging sensor 2. Thus, the spectral sensitivity of the imaging sensor 2 approximates to the visual sensitivity of humans, and a favorable image with good color reproduction can be obtained. The imaging optical system 100 may include any of the UV-IR-absorbing filters 1b, 1c, and 1d instead of the UV-IR-absorbing filter 1a.

EXAMPLES

The present invention will be described in more detail by examples. The present invention is not limited to the examples given below. First, methods for evaluation of UV-IR-absorbing filters according to Examples and Comparative Examples will be described.

<Measurement of Transmittance Spectrum of UV-IR-Absorbing Filter>

Transmittance spectra shown by UV-IR-absorbing filters according to Examples and Comparative Examples upon incidence of light in a wavelength range of 300 nm to 1200 nm on the UV-IR-absorbing filters were measured using an ultraviolet-visible spectrophotometer (manufactured by JASCO Corporation, product name: V-670). In this measurement, the incident angle of light incident on the UV-IR-absorbing filters was set to 0° (degree). To eliminate the influence of the difference in thickness among the absorbing layers of the UV-IR-absorbing filters on the transmittance spectra, the spectra were normalized so that the transmittance in the wavelength range of 750 nm to 900 nm in each spectrum had a given value. Specifically, the transmittance spectra actually measured for the UV-IR-absorbing filters according to Examples and Comparative Examples were multiplied by 100/92 to cancel the effect of interfacial reflection, and values of transmittance at different wavelengths were converted to values of absorbance, which were adjusted by being multiplied by a normalization coefficient. The resultant values were further multiplied by 92/100 to calculate normalized transmittance spectra. The normalization coefficient was determined for both of the following two conditions (1) and (2).

Condition (1): Adjust the maximum transmittance in the wavelength range of 750 to 900 nm in the actually measured transmittance spectrum to 1.0%.

Condition (2): Adjust the maximum transmittance in the wavelength range of 750 to 900 nm in the actually measured transmittance spectrum to 0.5%.

In a stage of development of the UV-IR-absorbing filter, the film thickness can vary among films formed of the UV-IR-absorbing composition applied to substrates. The variation may give a great influence on the spectral transmittance properties of the resultant UV-IR-absorbing filters. In a stage of commercial production (mass-production) of the UV-IR-absorbing filter, strict control of the conditions of the application of the UV-IR-absorbing composition and the film thickness makes it possible to uniformly adjust the spectral transmittance properties of the resultant UV-IR-absorbing filters. However, a quick process of trial, error, and feedback is important for evaluation of a prototype in the development stage. Therefore, in actual development, evaluation is desirably performed without strictly controlling the conditions of the application of the UV-IR-absorbing composition and the film thickness, based on an assumption that the film thickness varies among films formed of the UV-IR-absorbing composition. Hence, as described previously, relative evaluation of the spectral transmittance properties of the UV-IR-absorbing filters according to Examples and Comparative Examples was made possible by making the predefined correction of measured spectral transmittance properties so as to be able to ignore variation in film thickness among films formed of UV-IR-absorbing compositions according to Examples and Comparative Examples.

<Measurement of Thickness of Absorbing Layer>

The thicknesses of UV-IR-absorbing filters according to some of Examples and some of Comparative Examples were measured with a digital micrometer. The thickness of the absorbing layer of each UV-IR-absorbing filter was calculated by subtracting the thickness of a transparent glass substrate of the UV-IR-absorbing filter from the thickness of the UV-IR-absorbing filter. A product of the calculated thickness of the absorbing layer and the above normalization coefficient was defined as the "normalized thickness."

<Evaluation of Incident Angle Dependence of Transmittance Spectrum>

Transmittance spectra shown by a UV-IR-absorbing filter according to Example 21 upon incidence of light in a wavelength range of 300 nm to 1200 nm on the UV-IR-absorbing filter according to Example 21 at incident angles ranging from 0° to 65° at 5° intervals were measured using an ultraviolet-visible spectrophotometer (manufactured by JASCO Corporation, product name: V-670).

<Evaluation of Moisture Resistance>

The UV-IR-absorbing filters according to Examples and Comparative Examples were placed in a thermo-hygrostat set at a temperature of 85° C. and a relative humidity of 85% for 16 hours. Then, the UV-IR-absorbing filters were taken out from the thermo-hygrostat, and the appearances of the absorbing layers of the UV-IR-absorbing filters were visually observed.

Example 1

1.125 g of copper acetate monohydrate and 60 g of tetrahydrofuran (THF) were mixed, and the mixture was stirred for 3 hours to obtain a copper acetate solution. To the obtained copper acetate solution was then added 0.4115 g of PLYSURF A208N (manufactured by DKS Co., Ltd.) which is a phosphoric acid ester compound, and the mixture was stirred for 30 minutes to obtain a solution A. 10 g of THF was added to 0.4410 g of phenylphosphonic acid (manufactured by Nissan Chemical Industries, Ltd.), and the mixture was stirred for 30 minutes to obtain a solution B-1. 10 g of THF was added to 0.6610 g of 4-bromophenylphosphonic acid (manufactured by Tokyo Chemical Industry Co., Ltd.), and the mixture was stirred for 30 minutes to obtain a solution B-2. Next, the solutions B-1 and B-2 were mixed, and the mixture was stirred for 1 minute. 1.934 g of methyltriethoxysilane (MTES, manufactured by Shin-Etsu Chemical Co., Ltd.) and 0.634 g of tetraethoxysilane (TEOS, manufactured by KISHIDA CHEMICAL Co., Ltd., special grade) were added, and the mixture was stirred for another 1 minute to obtain a solution B. The solution B was added to the solution A while the solution A was stirred, and the mixture was stirred at room temperature for 1 minute. To the resultant solution was then added 25 g of toluene, and the mixture was stirred at room temperature for 1 minute to obtain a solution C. This solution C was placed in a flask and subjected to solvent removal using a rotary evaporator (manufactured by Tokyo Rikakikai Co. Ltd., product code: N-1110SF) under heating by means of an oil bath (manufactured by Tokyo Rikakikai Co. Ltd., product code: OSB-2100). The temperature of the oil bath was controlled to 105° C. The solution D subjected to the solvent removal was then collected from the flask. The solution D which is a dispersion of fine particles of copper phenyl-based phosphonate (absorber) was transparent, and the fine particles were well dispersed therein. The contents of the components in the solution D and the dispersion state of the fine particles in the solution D are shown in Table 1.

1.125 g of copper acetate monohydrate and 60 g of THF were mixed, and the mixture was stirred for 3 hours to obtain a copper acetate solution. To the obtained copper acetate solution was then added 0.7095 g of PLYSURF A208N which is a phosphoric acid ester compound, and the mixture was stirred for 30 minutes to obtain a solution E. 10 g of THF was added to 0.7075 g of n-butylphosphonic acid (manufactured by Nippon Chemical Industrial Co., Ltd.), and the mixture was stirred for 30 minutes to obtain a solution F. The solution F was added to the solution E while the solution E was stirred, and the mixture was stirred at room temperature for 1 minute. To the resultant solution was then added 25 g of toluene, and the mixture was stirred at room temperature for 1 minute to obtain a solution G. This solution G was placed in a flask and subjected to solvent removal using a rotary evaporator under heating by means of an oil bath. The temperature of the oil bath was controlled to 105° C. The solution H subjected to the solvent removal was then collected from the flask. The solution H which is a dispersion of fine particles of copper butylphosphonate (auxiliary absorber) was transparent, and the fine particles were well dispersed therein. The contents of the components in the solution H and the dispersion state of the fine particles in the solution H are shown in Table 2.

To the solution D was added 2.20 g of a silicone resin (manufactured by Shin-Etsu Chemical Co., Ltd., product name: KR-300), and the mixture was stirred for 30 minutes to obtain a solution I. The solution H in an amount of 4.09 g, which is equivalent to 20 mass % of the obtained solution H, was added to the solution I, and the mixture was stirred for 30 minutes to obtain a UV-IR-absorbing composition according to Example 1.

About 0.5 g of the UV-IR-absorbing composition according to Example 1 was applied with a dispenser to a 30 mm×30 mm central region of one principal surface of a transparent glass substrate (manufactured by SCHOTT AG, product name: D263) made of borosilicate glass and having dimensions of 76 mm×76 mm×0.21 mm. A film to be cured was thus formed on the substrate. Subsequently, the transparent glass substrate with the uncured film was placed in an oven, and the film was heat-treated at 85° C. for 6 hours to cure the film. After that, the transparent glass substrate with the film was placed in a thermo-hygrostat set at a temperature of 85° C. and a relative humidity of 85% and subjected to a humidification treatment for 20 hours to obtain a UV-IR-absorbing filter according to Example 1. A normalized transmittance spectrum of the UV-IR-absorbing filter according to Example 1 is shown by a solid line in FIG. 6. For normalized transmittance spectra of the UV-IR-absorbing filter according to Example 1, the properties are shown in Table 8. The result of the moisture resistance evaluation of the UV-IR-absorbing filter according to Example 1 is shown in Table 9.

A long-term moisture resistance test in which the UV-IR-absorbing filter according to Example 1 is exposed to an environment at a temperature of 60° C. and a relative humidity of 90% for 500 hours was performed. Transmittance spectra measured for the UV-IR-absorbing filter according to Example 1 before and after the long-term moisture resistance test was each normalized using the same normalization coefficient so as to allow the UV-IR-absorbing filter according to Example 1 measured before the long-term moisture resistance test to have a maximum transmittance of 1.0% or 0.5% in the wavelength range of 750 to 900 nm in the transmittance spectrum.

Specifically, a transmittance spectrum of the UV-IR-absorbing filter according to Example 1 was measured before the long-term moisture resistance test. Normalization coefficients $ST_{1\%}$ and $ST_{0.5\%}$ were calculated so that the maximum transmittance in the wavelength range of 750 to 900 nm would be 1% (condition (1)) and 0.5% (condition (2)). Normalized transmittance spectra of the UV-IR-absorbing filter according to Example 1 yet to be subjected to the long-term moisture resistance test were calculated with the normalization coefficients. Next, a transmittance spectrum of the UV-IR-absorbing filter according to Example 1 was measured after the long-term moisture resistance test, and normalized transmittance spectra of the UV-IR-absorbing filter according to Example 1 subjected to the long-term moisture resistance test were calculated with the normalization coefficients $ST_{1\%}$ and $ST_{0.5\%}$. The normalized transmittance spectra before and after the long-term moisture resistance test were calculated in this manner. The result of comparison of these is shown in Table 13. It is indicated that the UV-IR-absorbing filter according to Example 1 has stable transmittance properties varying little before and after the long-term moisture resistance test and has excellent moisture resistance. In Table 13, the average transmittances and maximum transmittance are shown to two decimal places to strictly show differences in transmittance properties between before and after the long-term moisture resistance test of the UV-IR-absorbing filter.

Example 2

Figure 7A:
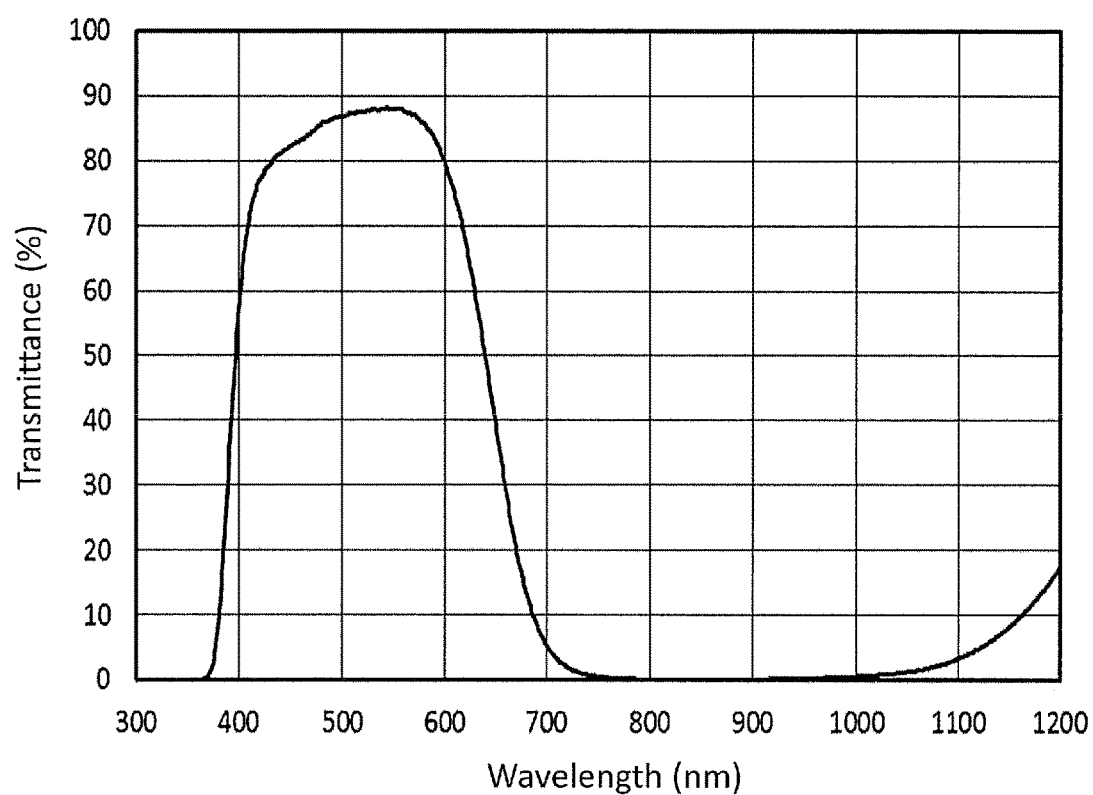
FIG. 7A shows a transmittance spectrum measured for a UV-IR-absorbing filter according to Example 2 before a moisture resistance test.
Figure 7B:
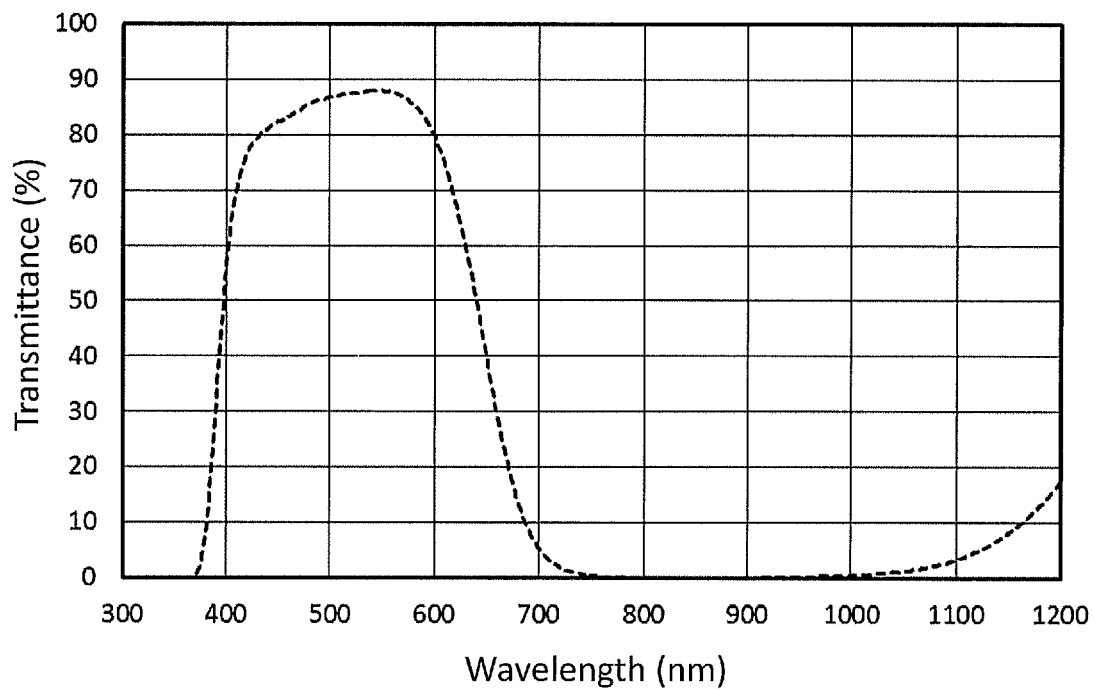
FIG. 7B shows a transmittance spectrum measured for the UV-IR-absorbing filter according to Example 2 after the moisture resistance test.

The solutions D and H were obtained in the same manner as in Example 1. To the solution D was added 2.20 g of a silicone resin (manufactured by Shin-Etsu Chemical Co., Ltd., product name: KR-300), and the mixture was stirred for 30 minutes to obtain a solution I. The solution H in an amount of 4.20 g, which is equivalent to 20 mass % of the obtained solution H, was added to the solution I, and the mixture was stirred for 30 minutes to obtain a UV-IR-absorbing composition according to Example 2. A UV-IR-absorbing filter according to Example 2 was obtained in the same manner as in Example 1, except that the UV-IR-absorbing composition according to Example 2 was used instead of the UV-IR-absorbing composition according to Example 1 and that the humidification treatment time was changed to 158 hours. For normalized transmittance spectra of the UV-IR-absorbing filter according to Example 2, the properties are shown in Table 8. The result of the moisture resistance evaluation of the UV-IR-absorbing filter according to Example 2 is shown in Table 9. The UV-IR-absorbing filter according to Example 2 was placed in a thermo-hygrostat set at a temperature of 85° C. and a relative humidity of 85% for 104 hours. Then, the UV-IR-absorbing filter was taken out from the thermo-hygrostat, and the appearance of the absorbing layer of the UV-IR-absorbing filter was visually observed. The absorbing layer was not whitish but transparent and showed a good appearance. The normalized transmittance spectrum of the UV-IR-absorbing filter according to Example 2 yet to be subjected to the 104-hour moisture resistance test is shown in FIG. 7A. The normalized transmittance spectrum of the UV-IR-absorbing filter according to Example 2 subjected to the 104-hour moisture resistance test is shown in FIG. 7B.

Example 3

1.125 g of copper acetate monohydrate and 60 g of THF were mixed, and the mixture was stirred for 3 hours to obtain a copper acetate solution. To the obtained copper acetate solution was then added 0.3431 g of PLYSURF A208N which is a phosphoric acid ester compound, and the mixture was stirred for 30 minutes to obtain a solution A. Additionally, 10 g of THF was added to 0.4490 g of phenylphosphonic acid, and the mixture was stirred for 30 minutes to obtain a solution B-1. Further, 10 g of THF was added to 0.6733 g of 4-bromophenylphosphonic acid, and the mixture was stirred for 30 minutes to obtain a solution B-2. Next, the solutions B-1 and B-2 were mixed, and the mixture was stirred for 1 minute. 2.862 g of MTES and 0.938 g of TEOS were added, and the mixture was stirred for another 1 minute to obtain a solution B. The solution B was added to the solution A while the solution A was stirred, and the mixture was stirred at room temperature for 1 minute. To the resultant solution was then added 25 g of toluene, and the mixture was stirred at room temperature for 1 minute to obtain a solution C. This solution C was placed in a flask and subjected to solvent removal using a rotary evaporator under heating by means of an oil bath. The temperature of the oil bath was controlled to 105° C. A solution D subjected to the solvent removal was then collected from the flask. The solution D which is a dispersion of fine particles of copper phenyl-based phosphonate (absorber) was transparent, and the fine particles were well dispersed therein.

To the solution D was added 2.20 g of a silicone resin (manufactured by Shin-Etsu Chemical Co., Ltd., product name: KR-300), and the mixture was stirred for 30 minutes to obtain a UV-IR-absorbing composition according to Example 3.

The UV-IR-absorbing composition according to Example 3 was applied with a dispenser to a 30 mm×30 mm central region of one principal surface of a transparent glass substrate made of borosilicate glass and having dimensions of 76 mm×76 mm×0.21 mm. Subsequently, the transparent glass substrate with the uncured film was placed in an oven, and the film was heat-treated at 85° C. for 2 hours to cure the film. After that, the transparent glass substrate with the film was placed in a thermo-hygrostat set at a temperature of 85° C. and a relative humidity of 85% and subjected to a humidification treatment for 62 hours to obtain a UV-IR-absorbing filter according to Example 3. For transmittance spectra of the UV-IR-absorbing filter according to Example 3, the properties are shown in Table 8. The result of the moisture resistance evaluation of the UV-IR-absorbing filter according to Example 3 is shown in Table 9.

Examples 4 to 20

Figure 6:
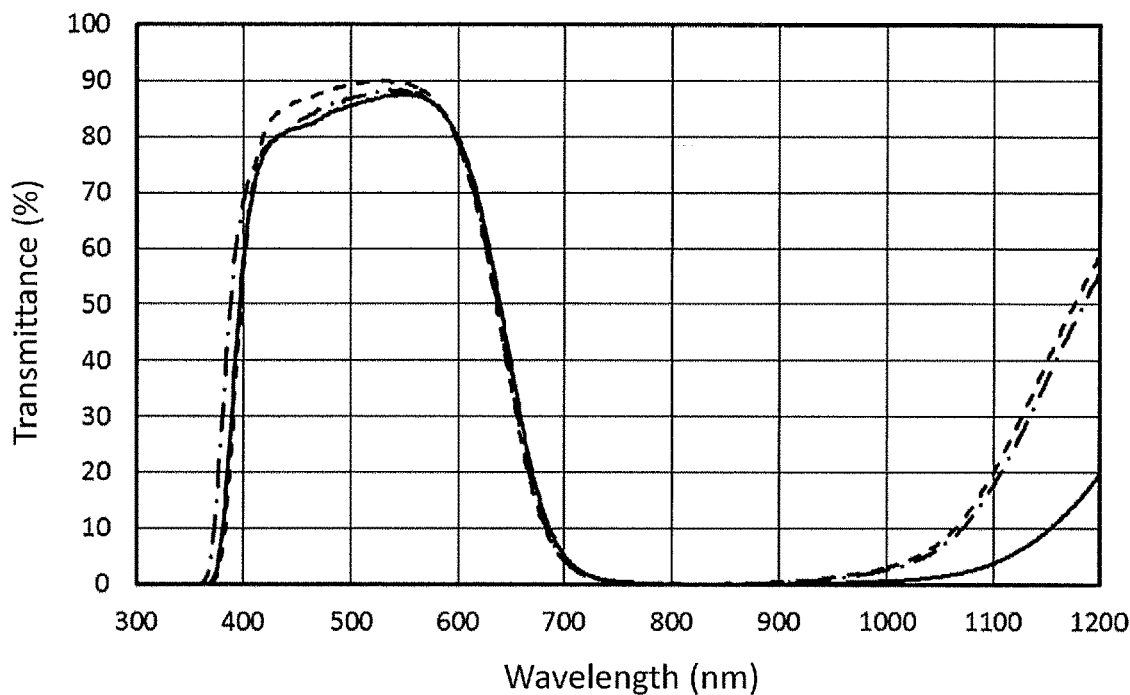
FIG. 6 shows transmittance spectra of UV-IR-absorbing filters according to Examples 1, 4, and 14.

UV-IR-absorbing compositions according to Examples 4 to 20 were prepared in the same manner as in Example 3, except that the amounts of the components of the UV-IR-absorbing compositions were adjusted as shown in Table 3. In Examples 14 to 20, PLYSURF A208F was used instead of PLYSURF A208N as the phosphoric acid ester compound. Additionally, UV-IR-absorbing filters according to Examples 4 to 20 were produced in the same manner as in Example 3, except that the conditions of the curing of the film and conditions of the humidification treatment of the transparent glass substrate with the film were adjusted as shown in Table 4. In the table, a treatment performed at X° C. for Y hours without adjusting the humidity is described as "X° C.:Yh" and a treatment performed at x° C. and a relative humidity of y % for z hours is described as "x° C.-y % RH:zh." Normalized transmittance spectra of the UV-IR-absorbing filters according to Examples 4 and 14 are shown in FIG. 6 by a dashed line and dash-dot line, respectively. For transmittance spectra of the UV-IR-absorbing filters according to Examples 4 to 20, the properties are shown in Table 8. The results of moisture resistance evaluation of the UV-IR-absorbing filters according to Examples 4 to 20 are shown in Table 9.

The content of the alkoxysilane monomer calculated as a hydrolysis-polycondensation product was determined as follows. The molecular weight of TEOS is 208.3267. Assuming that all TEOS turned into a hydrolysis-polycondensation product, the structural unit of the hydrolysis-polycondensation product can be described as $SiO_2$ (molecular weight: 60.0843). Therefore, the content of the alkoxysilane monomer calculated as a hydrolysis-polycondensation product is equivalent to 28.841% (=60.0843/208.3267) of the content of TEOS. As for MTES, the molecular weight of MTES is 178.3008. Assuming that all MTES turned into a hydrolysis-polycondensation product, the structural unit of the hydrolysis-polycondensation product can be described as $CH_3SiO_{3/2}$ (molecular weight: 67.1190). Therefore, the content of MTES calculated as a hydrolysis-polycondensation product is equivalent to 37.644% (=67.1190/178.3008) of the content of MTES.

Example 21

Figure 9:
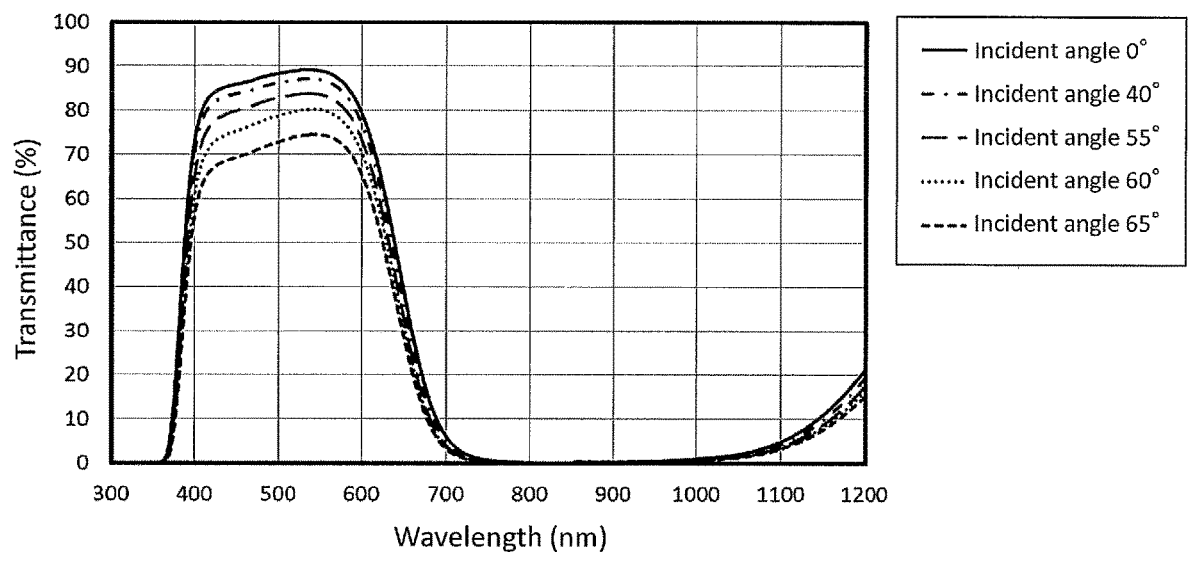
FIG. 9 shows transmittance spectra of a UV-IR-absorbing filter according to Example 21.

A UV-IR-absorbing filter according to Example 21 was obtained in the same manner as in Example 1, except that the thickness of the film formed of the UV-IR-absorbing composition according to Example 1 was changed. The thickness of the UV-IR-absorbing filter according to Example 21 is 123 μm. The result of the evaluation of the incident angle dependence of transmittance spectra of the UV-IR-absorbing filter according to Example 21 is shown in Table 12 and FIG. 9.

Comparative Examples 1 to 3

UV-IR-absorbing compositions according to Comparative Examples 1 to 3 were prepared in the same manner as in Example 3, except that PLYSURF A208F was used instead of PLYSURF A208N as the phosphoric acid ester compound and that the amounts of the components of the UV-IR-absorbing compositions were changed as shown in Table 5. Additionally, UV-IR-absorbing filters according to Comparative Examples 1 to 3 were produced in the same manner as in Example 3, except that the UV-IR-absorbing compositions according to Comparative Examples 1 to 3 were used and that the conditions of the humidification treatment of the transparent glass substrate with the film were adjusted as shown in Table 6. For transmittance spectra of the UV-IR-absorbing filters according to Comparative Examples 1 to 3, the properties are shown in Table 10. The results of the moisture resistance evaluation of the UV-IR-absorbing filters according to Comparative Examples 1 to 3 are shown in Table 11.

Comparative Examples 4, 5, and 6

Compositions according to Comparative Examples 4, 5, and 6 were obtained in the same manner as in Example 3, except that the amounts of the components of the compositions were adjusted as shown in Table 5. In Comparative Examples 4 and 5, PLYSURF A208F was used instead of PLYSURF A208N as the phosphoric acid ester compound. The compositions according to Comparative Examples 4, 5, and 6 were unable to be used as UV-IR-absorbing compositions because the fine particles (absorber) were aggregated.

Comparative Examples 7 to 9

Figure 8:
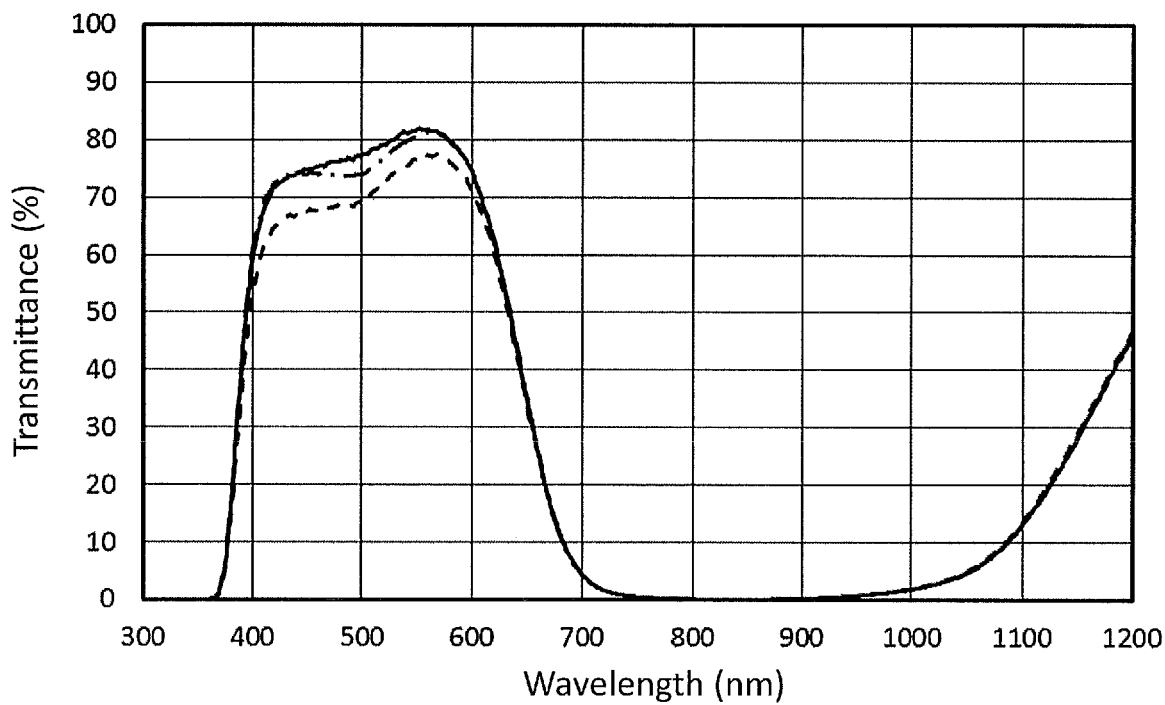
FIG. 8 shows transmittance spectra of UV-IR-absorbing filters according to Comparative Examples 7 to 9.

UV-IR-absorbing compositions according to Comparative Examples 7 to 9 were prepared in the same manner as in Example 3, except that a silicone oligomer (KR-311, KR-255, or KR-212: All of these are manufactured by Shin-Etsu Chemical Co., Ltd.) was used instead of MTES and TEOS and that the amounts of the components were adjusted as shown in Table 7. Additionally, UV-IR-absorbing filters according to Comparative Examples 7 to 9 were produced in the same manner as in Example 3, except that the UV-IR-absorbing compositions according to Comparative Examples 7 to 9 were used and that the conditions of the curing of the film and conditions of the humidification treatment of the transparent glass substrate with the film were adjusted as shown in Table 6. For transmittance spectra of the UV-IR-absorbing filters according to Comparative Examples 7 to 9, the properties are shown in Table 10. The results of the moisture resistance evaluation of the UV-IR-absorbing filters according to Comparative Examples 7 to 9 are shown in Table 11. Normalized transmittance spectra of the UV-IR-absorbing filters according to Comparative Examples 7 to 9 are shown in FIG. 8 by a solid line, dashed line, and dash-dot line, respectively.

As shown in Table 5, when the content of the phosphoric acid ester is small with respect to the content of the phosphonic acid as in Comparative Examples 4 and 5, the fine particles of the absorber cannot be dispersed appropriately and are aggregated. On the other hand, for example, as shown in Table 3, the fine particles of the absorber are dispersed appropriately in the UV-IR-absorbing composition according to Example 20 owing to the inclusion of the alkoxysilane monomer although the content of the phosphoric acid ester with respect to the content of the phosphonic acid is smaller. Additionally, as shown in Table 9, the UV-IR-absorbing filter according to Example 20 is indicated to have good moisture resistance owing to the smaller content of the phosphoric acid ester with respect to the content of the phosphonic acid.

The UV-IR-absorbing filter according to Example 19 indicates, as shown in Table 3 and Table 9, that even when only MTES is used as the alkoxysilane monomer, the fine particles of the absorber can be dispersed appropriately in the UV-IR-absorbing composition and the resultant UV-IR-absorbing filter can exhibit good moisture resistance.

Comparison between Example 17 and Example 18 indicates, as shown in Table 3, Table 4, and Table 8, that the humidification treatment increases the average transmittance in the wavelength range of 450 to 600 nm and the spectral transmittance of the UV-IR-absorbing filter in the visible light region. The reason is inferred that through the process in which the hydrolysis of the alkoxysilane monomer sufficiently progresses to promote formation of a repeating structure $(Si-O)_n$ of a siloxane bond, the fine particles in the film undergo a change in arrangement to a more desirable state.

The contents of the phosphoric acid ester of the UV-IR-absorbing compositions according to Examples 14 to 16 were half or less of those of the UV-IR-absorbing compositions according to Comparative Examples 1 to 3. Comparison between Examples 14 to 16 and Comparative Examples 1 to 3 indicates that even when the content of the phosphoric acid ester is decreased, desired optical properties and good moisture resistance can be imparted to the resultant UV-IR-absorbing filter by adding a predetermined amount of the alkoxysilane monomer, curing the film by a predetermined heat treatment, and then subjecting the film to the humidification treatment.

Comparison between Examples 3 to 13 and Examples 14 to 16 indicates that when different types of phosphoric acid esters are used for different UV-IR-absorbing compositions, inclusion of the alkoxysilane monomer in the UV-IR-absorbing compositions allows the fine particles of the absorber to be dispersed appropriately in the UV-IR-absorbing compositions and the resultant UV-IR-absorbing filters to exhibit desired optical properties. The comparison also indicates that inclusion of bromophenylphosphonic acid in the UV-IR-absorbing composition results in a slight shift of the ultraviolet cut-off wavelength to the long-wavelength side.

Examples 3 and 5 to 9 indicate that even when the content of the silicone resin which is the matrix resin is about half the content of the silicone resin in the UV-IR-absorbing composition according to any Example other than Examples 3 and 5 to 9, the resultant UV-IR-absorbing filter has desired optical properties and good moisture resistance. This indicates that the absorbing layer including the fine particles of copper phosphonate which is the absorber has very good moisture resistance and that the thickness of the UV-IR-absorbing filter can be decreased greatly. The possible reason is that the inclusion of the alkoxysilane monomer in the UV-IR-absorbing composition makes it possible to greatly decease the content of the phosphoric acid ester.

According to Example 8, even when the ratio ($\gamma$) of the content of the phosphonic acid to a sum of the content of the alkoxysilane monomer calculated as a hydrolysis-polycondensation product and the content of the phosphoric acid ester is as large as 1.151 in the UV-IR-absorbing composition, the fine particles of copper phosphonate which is the absorber can be dispersed appropriately in the UV-IR-absorbing composition. Moreover, the UV-IR-absorbing filter can exhibit desired optical properties. According to Comparative Example 6, when $\gamma$ is increased to 1.420, the fine particles of copper phosphonate are aggregated into a jelly-like state, the color of the composition is slightly whitish, and the fine particles are not dispersed appropriately. A desired range of $\gamma$ in the UV-IR-absorbing composition is consequently indicated to be 0.40 to 1.30.

As shown in Table 5, Comparative Examples 1 to 5 indicate that when the mass ratio ($\alpha$) of the content of the phosphonic acid to the content of the phosphoric acid ester is in the range of $0.250 \leq \alpha \leq 0.453$ in the UV-IR-absorbing composition, the fine particles of copper phosphonate can be dispersed in the UV-IR-absorbing composition. Moreover, as shown in Table 3 and Table 5, Examples 3 to 20 indicate that when a is greatly increased within the range of 0.856≤α≤3.271, in other word, when the content of the phosphoric acid ester is greatly decreased, the addition of the alkoxysilane monomer to the UV-IR-absorbing composition allows the fine particles of copper phosphonate to be dispersed in the UV-IR-absorbing composition. Furthermore, Examples 3 to 20 indicate that when a is at least in the range of 0.856≤α≤3.271, the UV-IR-absorbing filter having good moisture resistance can be obtained.

As shown in FIG. 6, FIG. 7A, and FIG. 7B, Examples 1 and 2 indicate that the UV-IR-absorbing filter having better optical properties can be produced by mixing the fine particles of copper phenyl-based phosphonate which is the absorber and the fine particles of copper butylphosphonate which is the auxiliary absorber and including the mixture in the same absorbing layer. Examples 1 and 2 indicate that the UV-IR-absorbing filter having better optical properties can be produced because the fine particles of copper phenyl-based phosphonate and the fine particles of copper butylphosphonate can be mixed and included in the same absorbing layer and that makes it possible to decrease the spectral transmittance in the vicinity of 1000 to 1100 nm where absorbance by the fine particles of copper phenyl-based phosphonate is low. Moreover, as shown in FIG. 7A and FIG. 7B, the UV-IR-absorbing filter according to Example 2 has good optical properties even after the 158-hour humidification treatment and the optical properties of the UV-IR-absorbing filter according to Example 2 are varied little by the 104-hour moisture resistance test in the environment at a temperature of 85° C. and a relative humidity of 85%. This indicates that the UV-IR-absorbing filter according to Example 2 has extremely high moisture resistance.

Comparative Examples 7 to 9 indicate that the fine particles of the absorber can be dispersed appropriately in the UV-IR-absorbing composition with the use of the silicone oligomer. However, as shown in FIG. 8, comparison between Comparative Examples 7 to 9 and Examples reveals that the average transmittance of the UV-IR-absorbing filters according to Comparative Examples 7 to 9 in the wavelength range of 450 to 600 nm is lower than the average transmittance of the UV-IR-absorbing filters according to Examples in the wavelength range of 450 to 600 nm. Additionally, the UV-IR-absorbing filters according to Comparative Examples 7 to 9 cannot be said to have good moisture resistance.

As shown in Table 8 and Table 10, the normalized thicknesses of the UV-IR-absorbing filters according to Examples 1, 4, 5, and 11 to 13 are smaller than the normalized thicknesses of the UV-IR-absorbing filters according to Comparative Examples 1 to 3. This indicates that the thickness of the absorbing layer of the UV-IR-absorbing filter is easily decreased according to the present invention. This is thought to be because the amount of the phosphoric acid ester which is the dispersant is more decreased in the UV-IR-absorbing compositions according to Examples 1, 4, 5, and 11 to 13 than in the UV-IR-absorbing compositions according to Comparative Examples 1 to 3 and the amount of the matrix resin such as the silicone resin can be decreased despite the decrease in the amount of the phosphoric acid ester.

As shown in Table 12, the result of comparison between the transmittance spectrum of the UV-IR-absorbing filter according to Example 21 at an incident angle of 0° and the transmittance spectrum of the UV-IR-absorbing filter according to Example 21 at an incident angle of 40° indicates that the UV-IR-absorbing filter according to Example 21 satisfies the above requirements (VI) and (VII). Additionally, in the case where the incident angle is more than 60°, the UV-IR-absorbing filter according to Example 21 shows very good incident angle dependence, although the average transmittance in the wavelength range of 450 to 600 nm is less than 80%. According to Example 21, it is found that a UV-IR-absorbing filter capable of keeping its optical performance upon incidence of light at such a large incident angle can be provided. Such advantages of the UV-IR-absorbing filter according to Example 21 allow imaging apparatuses such as wearable cameras and cameras mounted in mobile devices such as smartphones to have a wider angle of view over which images can be captured, so that it is possible to respond to a demand for imaging apparatuses that are thinner, have a lower profile, or have a wider angle of view.

TABLE 1

| | Materials used and their amounts [g] | | | | | | |
|---|---|---|---|---|---|---|---|
| | Phosphonic acid | | Phosphoric acid ester compound | | Alkoxysilane monomer | | Copper acetate |
| | Phenylphosphonic acid | 4-Bromophenylphosphonic acid | A208F | A208N | MTES | TEOS | monohydrate |
| Example 1 | 0.4410 | 0.6610 | — | 0.412 | 1.934 | 0.634 | 1.125 |
| Example 2 | 0.4410 | 0.6610 | — | 0.412 | 1.934 | 0.634 | 1.125 |

| | Mass ratio of content of phosphonic acid to content of phosphoric acid ester compound | Mass ratio of content of phosphonic acid to content of alkoxysilane monomer calculated as hydrolysis-polycondensation product and content of phosphoric acid ester compound | Molar ratio of content of phosphonic acid to content of copper ion | Dispersion state of fine particles |
|---|---|---|---|---|
| Example 1 | 2.678 | 0.833 | 0.990 | Good |
| Example 2 | 2.678 | 0.833 | 0.990 | Good |

TABLE 2

| | Materials used and their amounts [g] | | | |
|---|---|---|---|---|
| | n-Butylphosphonic acid | Phosphoric acid ester compound A208N | Copper acetate monohydrate | Dispersion state of fine particles |
| Example 1 | 0.7075 | 0.7095 | 1.125 | Good |
| Example 2 | 0.7075 | 0.7095 | 1.125 | Good |

TABLE 3

| | Materials used and their amounts [g] | | | | | | |
|---|---|---|---|---|---|---|---|
| | Phosphonic acid | | Phosphoric acid ester compound | | Alkoxysilane monomer | | Copper acetate monohydrate |
| | Phenylphosphonic acid | 4-Bromophenylphosphonic acid | A208F | A208N | MTES | TEOS | |
| Example 3 | 0.4490 | 0.6733 | — | 0.3431 | 2.862 | 0.938 | 1.125 |
| Example 4 | 0.4410 | 0.6610 | — | 0.4115 | 1.934 | 0.634 | 1.125 |
| Example 5 | 0.4410 | 0.6610 | — | 0.4115 | 1.934 | 0.634 | 1.125 |
| Example 6 | 0.4410 | 0.6610 | — | 0.4115 | 2.862 | 0.938 | 1.125 |
| Example 7 | 0.4410 | 0.6610 | — | 0.4115 | 1.547 | 0.507 | 1.125 |
| Example 8 | 0.4410 | 0.6610 | — | 0.4115 | 1.160 | 0.380 | 1.125 |
| Example 9 | 0.6097 | 0.3918 | — | 0.4573 | 2.862 | 0.938 | 1.125 |
| Example 10 | 0.6097 | 0.3918 | — | 0.4573 | 2.321 | 0.761 | 1.125 |
| Example 11 | 0.6024 | 0.3870 | — | 0.5020 | 2.321 | 0.761 | 1.125 |
| Example 12 | 0.5929 | 0.3810 | — | 0.5560 | 2.321 | 0.761 | 1.125 |
| Example 13 | 0.5821 | 0.3740 | — | 0.6235 | 2.321 | 0.761 | 1.125 |
| Example 14 | 0.8315 | 0.0000 | 0.6235 | — | 1.274 | 1.012 | 1.125 |
| Example 15 | 0.8115 | 0.0000 | 0.7100 | — | 1.911 | 1.518 | 1.125 |
| Example 16 | 0.7985 | 0.0000 | 0.7620 | — | 1.911 | 1.518 | 1.125 |
| Example 17 | 0.7985 | 0.0000 | 0.7620 | — | 1.274 | 1.012 | 1.125 |
| Example 18 | 0.7985 | 0.0000 | 0.7620 | — | 1.274 | 1.012 | 1.125 |
| Example 19 | 0.7665 | 0.0000 | 0.8950 | — | 0.910 | 0.000 | 1.125 |
| Example 20 | 0.7665 | 0.0000 | 0.8950 | — | 0.637 | 0.506 | 1.125 |

| | Mass ratio of content of phosphonic acid to content of phosphoric acid ester compound | Mass ratio of content of phosphonic acid to content of alkoxysilane monomer calculated as hydrolysis-polycondensation product and content of phosphoric acid ester compound | Molar ratio of content of phosphonic acid to content of copper ion | Dispersion state of fine particles |
|---|---|---|---|---|
| Example 3 | 3.271 | 0.664 | 1.008 | Good |
| Example 4 | 2.678 | 0.833 | 0.990 | Good |
| Example 5 | 2.678 | 0.833 | 0.990 | Good |
| Example 6 | 2.678 | 0.626 | 0.990 | Good |
| Example 7 | 2.678 | 0.967 | 0.990 | Good |
| Example 8 | 2.678 | 1.151 | 0.990 | Good |
| Example 9 | 2.190 | 0.555 | 0.978 | Good |
| Example 10 | 2.190 | 0.646 | 0.978 | Good |
| Example 11 | 1.971 | 0.620 | 0.966 | Good |
| Example 12 | 1.752 | 0.591 | 0.951 | Good |
| Example 13 | 1.533 | 0.557 | 0.934 | Good |
| Example 14 | 1.334 | 0.596 | 0.933 | Good |
| Example 15 | 1.143 | 0.435 | 0.911 | Good |
| Example 16 | 1.048 | 0.416 | 0.896 | Good |
| Example 17 | 1.048 | 0.521 | 0.896 | Good |
| Example 18 | 1.048 | 0.521 | 0.896 | Good |
| Example 19 | 0.856 | 0.619 | 0.860 | Good |
| Example 20 | 0.856 | 0.598 | 0.860 | Good |

TABLE 4

| | Amount [g] of matrix material (silicone resin) | Conditions of curing of film or conditions of humidification treatment | Appearance of absorbing layer (transparency) |
|---|---|---|---|
| Example 3 | 2.200 | 85° C.: 2 h, 85° C.-85% RH: 62 h | Good |
| Example 4 | 4.400 | 85° C.: 2 h, 85° C.-85% RH: 16 h | Good |
| Example 5 | 2.200 | 85° C.: 2 h, 85° C.-85% RH: 16 h | Good |
| Example 6 | 2.200 | 85° C.: 2 h, 85° C.-85% RH: 16 h | Good |
| Example 7 | 2.200 | 85° C.: 2 h, 85° C.-85% RH: 20 h | Good |
| Example 8 | 2.200 | 85° C.: 2 h, 85° C.-85% RH: 20 h | Good |
| Example 9 | 2.200 | 85° C.: 2 h, 85° C.-85% RH: 62 h | Good |
| Example 10 | 4.400 | 85° C.: 3 h, 125° C.: 3 h, 150° C.: 1 h, 170° C.: 3 h, 85° C.-85% RH: 4 h | Good |
| Example 11 | 4.400 | 85° C.: 3 h, 125° C.: 3 h, 150° C.: 1 h, 170° C.: 3 h, 85° C.-85% RH: 4 h | Good |
| Example 12 | 4.400 | 85° C.: 3 h, 125° C.: 3 h, 150° C.: 1 h, 170° C.: 3 h, 85° C.-85% RH: 4 h | Good |
| Example 13 | 4.400 | 85° C.: 3 h, 125° C.: 3 h, 150° C.: 1 h, 170° C.: 3 h, 85° C.-85% RH: 4 h | Good |
| Example 14 | 4.400 | 85° C.: 3 h, 125° C.: 3 h, 150° C.: 1 h, 170° C.: 3 h, 85° C.-85% RH: 20 h | Good |
| Example 15 | 4.400 | 85° C.: 3 h, 125° C.: 3 h, 150° C.: 1 h, 170° C.: 3 h, 85° C.-85% RH: 16 h | Good |
| Example 16 | 4.400 | 85° C.: 3 h, 125° C.: 3 h, 150° C.: 1 h, 170° C.: 3 h, 85° C.-85% RH: 16 h | Good |
| Example 17 | 4.400 | 85° C.: 3 h, 125° C.: 3 h, 150° C.: 1 h, 170° C.: 3 h | Good |
| Example 18 | 4.400 | 85° C.: 3 h, 125° C.: 3 h, 150° C.: 1 h, 170° C.: 3 h, 85° C.-85% RH: 16 h | Good |
| Example 19 | 4.400 | 85° C.: 3 h, 125° C.: 3 h, 150° C.: 1 h, 170° C.: 1 h | Good |
| Example 20 | 4.400 | 85° C.: 3 h, 125° C.: 3 h, 150° C.: 1 h, 170° C.: 1 h | Good |

TABLE 5

| | Materials used and their amounts [g] | | | | | | |
|---|---|---|---|---|---|---|---|
| | Phosphonic acid | | Phosphoric acid ester compound | | Alkoxysilane monomer | | Copper acetate monohydrate |
| | Phenylphosphonic acid | 4-Bromophenylphosphonic acid | A208F | A208N | MTES | TEOS | |
| Comparative Example 1 | 0.4277 | 0.2747 | 1.5500 | — | — | — | 1.125 |
| Comparative Example 2 | 0.5848 | 0.0000 | 2.3382 | — | — | — | 1.125 |
| Comparative Example 3 | 0.6545 | 0.0000 | 1.8705 | — | — | — | 1.125 |
| Comparative Example 4 | 0.6174 | 0.0000 | 1.2348 | — | — | — | 1.125 |
| Comparative Example 5 | 0.7350 | 0.0000 | 1.4030 | — | — | — | 1.125 |
| Comparative Example 6 | 0.4410 | 0.6610 | — | 0.4115 | 0.774 | 0.254 | 1.125 |

| | Mass ratio of content of phosphonic acid to content of phosphoric acid ester compound | Mass ratio of content of phosphonic acid to content of alkoxysilane monomer calculated as hydrolysis-polycondensation product and content of phosphoric acid ester compound | Molar ratio of content of phosphonic acid to content of copper ion | Dispersion state of fine particles |
|---|---|---|---|---|
| Comparative Example 1 | 0.453 | 0.453 | 0.686 | Good |
| Comparative Example 2 | 0.25 | 0.25 | 0.656 | Good |
| Comparative Example 3 | 0.25 | 0.25 | 0.63 | Good |
| Comparative Example 4 | 0.5 | 0.5 | 0.693 | Poor (Aggregated) |
| Comparative Example 5 | 0.524 | 0.524 | 0.825 | Poor (Aggregated) |
| Comparative Example 6 | 2.678 | 1.42 | 0.99 | Poor (Aggregated) |

TABLE 6

| | Amount [g] of matrix material (silicone resin) | Conditions of curing of film or conditions of humidification treatment | Appearance of absorbing layer (transparency) |
|---|---|---|---|
| Comparative Example 1 | 4.400 | 85° C.: 3 h, 125° C.: 3 h, 150° C.: 1 h, 170° C.: 3 h | Good |
| Comparative Example 2 | 4.400 | 85° C.: 3 h, 125° C.: 3 h, 150° C.: 1 h, 170° C.: 3 h | Good |
| Comparative Example 3 | 4.400 | 85° C.: 3 h, 125° C.: 3 h, 150° C.: 1 h, 170° C.: 3 h | Good |
| Comparative Example 7 | 4.400 | 85° C.: 3 h, 125° C.: 3 h, 150° C.: 1 h, 170° C.: 1 h | Good |
| Comparative Example 8 | 4.400 | 85° C.: 3 h, 125° C.: 3 h, 150° C.: 1 h, 170° C.: 1 h | Good |
| Comparative Example 9 | 4.400 | 85° C.: 3 h, 125° C.: 3 h, 150° C.: 1 h, 170° C.: 1 h | Good |

TABLE 7

| | Materials used and their amounts [g] | | | | | | |
|---|---|---|---|---|---|---|---|
| | Phosphonic acid | | Phosphoric acid ester compound | Silicone oligomer | | | Copper acetate monohydrate |
| | Phenylphosphonic acid | 4-Bromophenylphosphonic acid | A208N | KR-311 | KR-255 | KR-212 | |
| Comparative Example 7 | 0.5821 | 0.3740 | 0.6235 | 1.822 | — | — | 1.125 |
| Comparative Example 8 | 0.5821 | 0.3740 | 0.6235 | — | 2.186 | — | 1.125 |
| Comparative Example 9 | 0.5821 | 0.3740 | 0.6235 | — | — | 1.561 | 1.125 |

| | Mass ratio of content of phosphonic acid to content of phosphoric acid ester compound | Molar ratio of content of phosphonic acid to content of copper ion | Dispersion state of fine particles |
|---|---|---|---|
| Comparative Example 7 | 1.533 | 0.934 | Good |
| Comparative Example 8 | 1.533 | 0.934 | Good |
| Comparative Example 9 | 1.533 | 0.934 | Good |

TABLE 8

| | Average transmittance [%] in wavelength range of 450 to 600 nm | | Maximum transmittance [%] in wavelength range of 750 to 900 nm | | Average transmittance [%] in wavelength range of 350 to 370 nm | | IR cut-off wavelength [nm] | | UV cut-off wavelength [nm] | | Normalized thickness [μm] |
|---|---|---|---|---|---|---|---|---|---|---|---|
| Example Normalization | Condition (1) | Condition (2) | Condition (1) | Condition (2) | Condition (1) | Condition (2) | Condition (1) | Condition (2) | Condition (1) | Condition (2) | Condition (2) |
| Example 1 | 86.1 | 85.3 | 1 | 0.5 | 0.2 | 0.1 | 643 | 638 | 395 | 397 | 134 |
| Example 2 | 86.7 | 86 | 1 | 0.5 | 0.2 | 0.1 | 644 | 640 | 395 | 397 | |
| Example 3 | 87.6 | 87 | 1 | 0.5 | 0.1 | 0 | 642 | 638 | 395 | 397 | |
| Example 4 | 88.4 | 87.9 | 1 | 0.5 | 0.1 | 0 | 640 | 636 | 396 | 397 | 166 |
| Example 5 | 88.3 | 87.7 | 1 | 0.5 | 0.1 | 0 | 642 | 638 | 395 | 397 | 113 |
| Example 6 | 87.3 | 86.6 | 1 | 0.5 | 0.2 | 0.1 | 636 | 632 | 394 | 395 | |
| Example 7 | 85.2 | 84.2 | 1 | 0.5 | 0.1 | 0 | 642 | 638 | 397 | 399 | |
| Example 8 | 80.6 | 79 | 1 | 0.5 | 0.1 | 0 | 640 | 636 | 400 | 403 | |

TABLE 8-continued

| Example Normalization | Average transmittance [%] in wavelength range of 450 to 600 nm | | Maximum transmittance [%] in wavelength range of 750 to 900 nm | | Average transmittance [%] in wavelength range of 350 to 370 nm | | IR cut-off wavelength [nm] | | UV cut-off wavelength [nm] | | Normalized thickness [μm] |
|---|---|---|---|---|---|---|---|---|---|---|---|
| | Condition (1) | Condition (2) | Condition (1) | Condition (2) | Condition (1) | Condition (2) | Condition (1) | Condition (2) | Condition (1) | Condition (2) | Condition (2) |
| Example 9 | 88.2 | 87.6 | 1 | 0.5 | 0.9 | 0.5 | 635 | 630 | 388 | 389 | |
| Example 10 | 87.6 | 87 | 1 | 0.5 | 0.4 | 0.2 | 641 | 637 | 391 | 392 | |
| Example 11 | 87.3 | 86.6 | 1 | 0.5 | 0.4 | 0.2 | 641 | 637 | 391 | 393 | 176 |
| Example 12 | 87.4 | 86.7 | 1 | 0.5 | 0.4 | 0.2 | 642 | 637 | 391 | 393 | 167 |
| Example 13 | 87.8 | 87.2 | 1 | 0.5 | 0.4 | 0.2 | 642 | 638 | 390 | 392 | 176 |
| Example 14 | 86.8 | 86 | 1 | 0.5 | 1.3 | 0.8 | 641 | 637 | 386 | 388 | |
| Example 15 | 87.3 | 86.7 | 1 | 0.5 | 1.3 | 0.8 | 642 | 638 | 386 | 388 | |
| Example 16 | 86.8 | 86 | 1 | 0.5 | 1.3 | 0.8 | 641 | 637 | 386 | 388 | |
| Example 17 | 84.7 | 83.6 | 1 | 0.5 | 1.5 | 0.9 | 639 | 634 | 386 | 388 | |
| Example 18 | 86.8 | 86.1 | 1 | 0.5 | 1.4 | 0.9 | 640 | 636 | 385 | 387 | |
| Example 19 | 81.3 | 79.8 | 1 | 0.5 | 0.1 | 0 | 639 | 634 | 401 | 404 | |
| Example 20 | 82.8 | 81.5 | 1 | 0.5 | 0.1 | 0.1 | 634 | 629 | 397 | 399 | |

TABLE 9

| | Result of moisture resistance evaluation (Appearance of absorbing layer after moisture resistance test) |
|---|---|
| Example 1 | Good |
| Example 2 | Good |
| Example 3 | Good |
| Example 4 | Good |
| Example 5 | Good |
| Example 6 | Good |
| Example 7 | Good |
| Example 8 | Good |
| Example 9 | Good |
| Example 10 | Good |
| Example 11 | Good |
| Example 12 | Good |
| Example 13 | Good |
| Example 14 | Good |
| Example 15 | Good |
| Example 16 | Good |
| Example 17 | Good |
| Example 18 | Good |
| Example 19 | Good |
| Example 20 | Good |

TABLE 10

| Normalization | Average transmittance [%] in wavelength range of 450 to 600 nm | | Maximum transmittance [%] in wavelength range of 750 to 900 nm | | Average transmittance [%] in wavelength range of 350 to 370 nm | | IR cut-off wavelength [nm] | | UV cut-off wavelength [nm] | | Normalized thickness [μm] |
|---|---|---|---|---|---|---|---|---|---|---|---|
| | Condition (1) | Condition (2) | Condition (1) | Condition (2) | Condition (1) | Condition (2) | Condition (1) | Condition (2) | Condition (1) | Condition (2) | Condition (2) |
| Comparative Example 1 | 86.3 | 85.4 | 1 | 0.5 | 0.4 | 0.2 | 642 | 638 | 391 | 393 | 257 |
| Comparative Example 2 | 88.3 | 87.7 | 1 | 0.5 | 2.7 | 1.8 | 641 | 636 | 383 | 384 | 284 |
| Comparative Example 3 | 89.5 | 89.1 | 1 | 0.5 | 1.5 | 0.9 | 644 | 639 | 386 | 387 | 273 |
| Comparative Example 7 | 80.2 | 78.5 | 1 | 0.5 | 0.5 | 0.3 | 639 | 634 | 392 | 394 | |
| Comparative Example 8 | 74.8 | 72.5 | 1 | 0.5 | 0.4 | 0.2 | 637 | 633 | 395 | 397 | |
| Comparative Example 9 | 78.8 | 77 | 1 | 0.5 | 0.5 | 0.3 | 639 | 635 | 391 | 393 | |

TABLE 11

| | Result of moisture resistance evaluation (Appearance of absorbing layer after moisture resistance test) |
|---|---|
| Comparative Example 1 | Whitish |
| Comparative Example 2 | Whitish |
| Comparative Example 3 | Whitish |
| Comparative Example 7 | Whitish |
| Comparative Example 8 | Whitish |
| Comparative Example 9 | Whitish |

TABLE 12

| Incident angle [°] | Average transmittance [%] in wavelength range of 450 to 600 nm | Average transmittance [%] in wavelength range of 750 to 900 nm | Average transmittance [%] in wavelength range of 350 to 370 nm | IR cut-off wavelength [nm] | UV cut-off wavelength [nm] |
|---|---|---|---|---|---|
| 0 | 87.2 | 0.7 | 0.9 | 639 | 388 |
| 5 | 87.1 | 0.7 | 0.9 | 639 | 388 |
| 10 | 87.0 | 0.7 | 0.9 | 639 | 388 |
| 15 | 86.8 | 0.7 | 0.9 | 638 | 388 |
| 20 | 86.6 | 0.7 | 0.9 | 638 | 388 |
| 25 | 86.4 | 0.6 | 0.8 | 638 | 388 |
| 30 | 86.1 | 0.6 | 0.8 | 637 | 388 |
| 35 | 85.6 | 0.6 | 0.7 | 636 | 388 |
| 40 | 85.1 | 0.5 | 0.7 | 635 | 389 |
| 45 | 84.4 | 0.5 | 0.6 | 635 | 389 |
| 50 | 83.5 | 0.4 | 0.5 | 633 | 390 |
| 55 | 81.7 | 0.4 | 0.5 | 632 | 391 |
| 60 | 77.9 | 0.4 | 0.4 | 629 | 393 |
| 65 | 72.2 | 0.4 | 0.3 | 625 | 395 |

TABLE 13

| Normalization condition | Average transmittance [%] in wavelength range of 450 to 600 nm | | Maximum transmittance [%] in wavelength range of 750 to 900 nm | | Average transmittance [%] in wavelength range of 350 to 370 nm | | IR cut-off wavelength [nm] | | UV cut-off wavelength [nm] | |
|---|---|---|---|---|---|---|---|---|---|---|
| | Condition (1) | Condition (2) | Condition (1) | Condition (2) | Condition (1) | Condition (2) | Condition (1) | Condition (2) | Condition (1) | Condition (2) |
| Before long-term moisture resistance test | 86.14 | 85.28 | 1.00 | 0.50 | 0.17 | 0.07 | 643 | 638 | 395 | 397 |
| After long-term moisture resistance test | 85.76 | 84.84 | 0.97 | 0.48 | 0.19 | 0.08 | 642 | 637 | 395 | 396 |

The invention claimed is:

1. An ultraviolet- and infrared-absorbing composition comprising:
an absorber formed by a phosphonic acid represented by the following formula (a) and copper ion, the absorber being dispersed in the ultraviolet- and infrared-absorbing composition:

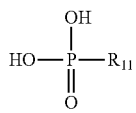

wherein $R_{11}$ is a phenyl group, a nitrophenyl group, a hydroxyphenyl group, or a halogenated phenyl group in which at least one hydrogen atom of a phenyl group is substituted by a halogen atom;
a phosphoric acid ester allowing the absorber to be dispersed;
a matrix resin; and
an alkoxysilane monomer.

2. The ultraviolet- and infrared-absorbing composition according to claim 1, wherein the ratio of the content of the phosphonic acid to the content of the phosphoric acid ester is 0.80 or more on a mass basis.

3. The ultraviolet- and infrared-absorbing composition according to claim 1, wherein the ratio of the content of the phosphonic acid to a sum of the content of the alkoxysilane monomer calculated as a hydrolysis-polycondensation product and the content of the phosphoric acid ester is 0.40 to 1.30.

4. The ultraviolet- and infrared-absorbing composition according to claim 1, wherein the matrix resin is a silicone resin.

5. The ultraviolet- and infrared-absorbing composition according to claim 1, further comprising an auxiliary absorber formed by a phosphonic acid represented by the following formula (b) and copper ion:

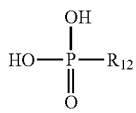

wherein $R_{12}$ is an alkyl group having 6 or less carbon atoms, a benzyl group, or a halogenated benzyl group in which at least one hydrogen atom of a benzene ring of a benzyl group is substituted by a halogen atom.

6. An ultraviolet- and infrared-absorbing filter comprising:
a transparent dielectric substrate; and
an absorbing layer comprising, an absorber formed by a phosphonic acid represented by the following formula (a) and copper ion, a phosphoric acid ester allowing the absorber to be dispersed, and a compound having a siloxane bond, the absorbing layer formed parallel to one principal surface of the transparent dielectric substrate:

wherein $R_{11}$ is a phenyl group, a nitrophenyl group, a hydroxyphenyl group, or a halogenated phenyl group in which at least one hydrogen atom of a phenyl group is substituted by a halogen atom.

7. The ultraviolet- and infrared-absorbing filter according to claim 6, wherein the compound having the siloxane bond comprises a hydrolysis-polycondensation compound of an alkoxysilane monomer.

8. The ultraviolet- and infrared-absorbing filter according to claim 6, wherein the compound having the siloxane bond comprises a silicone resin.

9. The ultraviolet- and infrared-absorbing filter according to claim 6, wherein the ratio of the content of the phosphonic acid to the content of the phosphoric acid ester is 0.80 or more on a mass basis.

10. The ultraviolet- and infrared-absorbing filter according to claim 6, wherein
(I) the ultraviolet- and infrared-absorbing filter has an average spectral transmittance of 80% or more in a wavelength range of 450 nm to 600 nm,
(II) the ultraviolet- and infrared-absorbing filter has a spectral transmittance of 3% or less in a wavelength range of 750 nm to 900 nm,
(III) the ultraviolet- and infrared-absorbing filter has an average spectral transmittance of 4% or less in a wavelength range of 350 nm to 370 nm,
(IV) the ultraviolet- and infrared-absorbing filter has a decreasing spectral transmittance with increasing wavelength in a wavelength range of 600 nm to 800 nm and, when a wavelength which lies in the wavelength range of 600 nm to 800 nm and at which the spectral transmittance of the ultraviolet- and infrared-absorbing filter is 50% is defined as an infrared cut-off wavelength, the infrared cut-off wavelength for light incident on the ultraviolet- and infrared-absorbing filter at an incident angle of 0° is in a range of 620 nm to 680 nm, and
(V) the ultraviolet- and infrared-absorbing filter has an increasing spectral transmittance with increasing wavelength in a wavelength range of 350 nm to 450 nm and, when a wavelength which lies in the wavelength range of 350 nm to 450 nm and at which the spectral transmittance of the ultraviolet- and infrared-absorbing filter is 50% is defined as an ultraviolet cut-off wavelength, the ultraviolet cut-off wavelength for light incident on the ultraviolet- and infrared-absorbing filter at an incident angle of 0° is in a range of 380 nm to 430 nm.

11. The ultraviolet- and infrared-absorbing filter according to claim 6, wherein the absorbing layer further comprises an auxiliary absorber formed by a phosphonic acid represented by the following formula (b) and copper ion:

wherein $R_{12}$ is an alkyl group having 6 or less carbon atoms, a benzyl group, or a halogenated benzyl group in which at least one hydrogen atom of a benzene ring of a benzyl group is substituted by a halogen atom.

12. The ultraviolet- and infrared-absorbing filter according claim 6, wherein the absorbing layer has a thickness of 200 μm or less.

13. The ultraviolet- and infrared-absorbing filter according to claim 6, wherein when a long-term moisture resistance test in which the ultraviolet- and infrared-absorbing filter is exposed to an environment at a temperature of 60° C. and a relative humidity of 90% for 500 hours is performed and transmittance spectra measured for the ultraviolet- and infrared-absorbing filter before and after the long-term moisture resistance test are each normalized using the same normalization coefficient so as to allow the ultraviolet- and infrared-absorbing filter measured before the long-term moisture resistance test to have a maximum transmittance of 1.0% or 0.5% in the wavelength range of 750 to 900 nm in the transmittance spectrum, (i) an absolute value of a difference between the average transmittance in the wavelength range of 450 to 600 nm before the long-term moisture resistance test and the average transmittance in the wavelength range of 450 to 600 nm after the long-term moisture resistance test is 3 points or less, (ii) an absolute value of a difference between the average transmittance in the wavelength range of 350 to 370 nm before the long-term moisture resistance test and the average transmittance in the wavelength range of 350 to 370 nm after the long-term moisture resistance test is 1 point or less, (iii) an absolute value of a difference between the maximum transmittance in the wavelength range of 750 to 900 nm before the long-term moisture resistance test and the maximum transmittance in the wavelength range of 750 to 900 nm after the long-term moisture resistance test is 1 point or less, (iv) the ultraviolet- and infrared-absorbing filter has a decreasing spectral transmittance with increasing wavelength in a wavelength range of 600 nm to 800 nm and, when a wavelength which lies in the wavelength range of 600 nm to 800 nm and at which the spectral transmittance of the ultraviolet- and infrared-absorbing filter is 50% is defined as an infrared cut-off wavelength, an absolute value of a difference between the infrared cut-off wavelength before the long-term moisture resistance test and the infrared cut-off wavelength after the long-term moisture resistance test is 3 nm or less, and (v) the ultraviolet- and infrared-absorbing filter has an increasing spectral transmittance with increasing wavelength in a wavelength range of 350 nm to 450 nm and, when a wavelength which lies in the wavelength range of 350 nm to 450 nm and at which the spectral transmittance of the ultraviolet- and infrared-absorbing filter is 50% is defined as an ultraviolet cut-off wavelength, an absolute value of a difference between the ultraviolet cut-off wavelength before the long-term moisture resistance test and the ultraviolet cut-off wavelength after the long-term moisture resistance test is 3 nm or less.

14. A method for producing ultraviolet- and infrared-absorbing filters, comprising:

applying the ultraviolet- and infrared-absorbing composition according to claim 6 parallel to one principal surface of a transparent dielectric substrate to form a film on the one principal surface, and, exposing the film to an environment at a temperature of 50° C. to 200° C. and to an environment at a temperature of 50° C. to 100° C. and a relative humidity of 80% to 100% to form an absorbing layer.

* * * * *